US005734547A

United States Patent [19]
Iversen

[11] Patent Number: 5,734,547
[45] Date of Patent: Mar. 31, 1998

[54] POWER SWITCHGEAR

[76] Inventor: Arthur H. Iversen, 15315 Sobey Rd., Saratoga, Calif. 95070

[21] Appl. No.: 702,886

[22] Filed: Aug. 26, 1996

Related U.S. Application Data

[63] Continuation-in-part of Ser. No. 622,525, Mar. 25, 1996, which is a continuation-in-part of Ser. No. 387,351, Feb. 13, 1995, Pat. No. 5,550,707.

[51] Int. Cl.⁶ .................................................. H02B 1/14
[52] U.S. Cl. .................... 361/617; 200/1; 200/7; 200/89; 200/46
[58] Field of Search ................... 200/50.21, 50.22, 200/50.27, 304–306; 218/1–7, 34, 36, 46, 76, 77, 89, 156, 158; 361/605, 607, 609, 615, 617

[56] References Cited

U.S. PATENT DOCUMENTS

| | | | |
|---|---|---|---|
| 2,646,481 | 7/1953 | Wood et al. | 218/36 |
| 4,086,452 | 4/1978 | Collins | 200/50 AA |
| 4,090,230 | 5/1978 | Fuller | 361/345 |
| 4,216,521 | 8/1980 | Merola | 361/345 |
| 4,272,798 | 6/1981 | Merola | 361/345 |
| 4,285,026 | 8/1981 | Clausing | 361/617 |
| 4,395,602 | 7/1983 | Castonguay | 361/617 |
| 4,827,374 | 5/1989 | Dunn | 361/345 |
| 5,181,164 | 1/1993 | Beard et al. | 361/345 |
| 5,475,193 | 12/1995 | Perdoncin | 218/36 |
| 5,486,978 | 1/1996 | Fishovitz | 361/617 |

FOREIGN PATENT DOCUMENTS

| | | | |
|---|---|---|---|
| 0165332 | 12/1985 | European Pat. Off. | 218/1 |
| 224703A | 6/1987 | European Pat. Off. | 361/617 |
| 384052 | 3/1961 | Switzerland | 218/1 |
| 197709 | 9/1977 | U.S.S.R. | |

OTHER PUBLICATIONS

Current Limiting Switching By Squeezing Arcs Into Narrow Insulating Slots, Lindmayer M. and Zhiqiang H., IEEE–CHMT, vol. 15, #2, Apr. 1992, pp. 160–165.

*Primary Examiner*—Gregory D. Thompson
*Attorney, Agent, or Firm*—Armstrong, Teasdale, Schlafly & Davis

[57] ABSTRACT

The present invention, in one form, is an apparatus for interrupting current flow between a fixed contact and a movable contact. An insulating partition has an aperture, and the fixed contact and movable contact are on opposite sides of the partition aperture. The movable contact is coupled to a first movable electrically insulating member, and the first insulating member is coupled to a second movable insulating member, each member being adjacent the partition. A third movable insulating member is coupled to the partition opposite the first and second insulating members with respect to the aperture. The third insulating member extends partially over the aperture. The first and second member are coupled to the movable contact so that when the movable contact is moved to an open current-interrupting position, the second insulating member covers the aperture, and the first insulating member engages the third insulating member and covers both the second insulating member and the aperture.

22 Claims, 7 Drawing Sheets

FIG_1

FIG_2

FIG_7

FIG_8

FIG_12 FIG_11

FIG_9 FIG_10

FIG_13

FIG_14

FIG_15

FIG_16

FIG_17

FIG_18     FIG_19     FIG_20

FIG_21     FIG_22     FIG_23

FIG_27

FIG_28

$\frac{d}{v}$ = 5.5 ms

| TIME | φ1 | φ2 | φ3 |
|---|---|---|---|
| 0 | 0° | — | — |
| 5.5 ms | 120° | 0° | — |
| 11 ms | 240° | 120° | 0° |

FIG_29

5,734,547

POWER SWITCHGEAR

RELATED APPLICATIONS

This application is a continuation-in-part of Iversen, "Low Cost Power Switchgear", U.S. patent application Ser. No. 08/622,525, filed on Mar. 25, 1996, which is a continuation-in-part of Iversen, "Low Cost Power Switchgear", U.S. patent application Ser. No. 08/387,351, filed on Feb. 13, 1995 now U.S. Pat. No. 5,550,707.

BACKGROUND OF INVENTION

1. Field of Invention

The present invention relates to switchgear including switching and interrupting devices used, for example, in connection with the generation, transmission, distribution and conversion of electric power.

2. Related Art

Known switchgear, such as circuit breakers, employ various structures to extinguish the arc generated upon contactor opening under fault conditions. The behavior of switchgear is dependent on the current broken and the arc energy. The arc is resilient and can be stretched, and possesses resistance which can be increased by lengthening and by confinement. Known techniques for arc extinction include, increasing the arc length, cooling the arc, and splitting the arc into a number of series arcs. Arc chutes of both the insulated plate and cold cathode types are commonly used for arc extinction. Power arcs can evade deionization systems by swerving, by striking out in new and unexpected directions, and by reigniting after they appear to have been successfully extinguished. There is a need for switchgear capable of predictable and consistent arc extinction, of substantial elimination of arc re-strikes, and of low cost.

SUMMARY OF THE INVENTION

The present invention, in one aspect, is a method for extinguishing arcs in switchgear. The method includes the steps of physically severing the arc and substantially simultaneously interposing a high dielectric strength insulating barrier between the fixed contact and the retreating moving contact. This method is believed to provide substantially consistent and predictable arc extinguishing characteristics. When the dielectric strength of the barrier exceeds the applied voltage, the arc cannot maintain itself or reignite. The short stroke of the moving contacts enables improved zero crossing synchronization and economy in the cost of the mechanism.

DETAILED DESCRIPTION OF THE DRAWINGS

Figure 1:
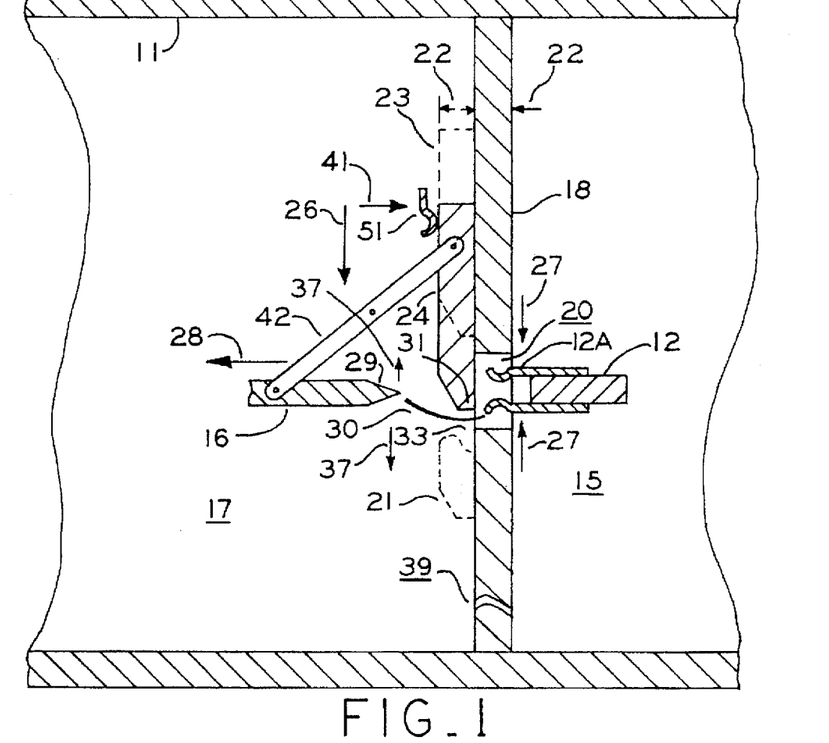
FIG. 1 is a partial cross section view of the present invention illustrating separation of contacts during the arcing process with the guillotine about to sever the arc.

For convenience, embodiments described herein will be described in terms of circuit breakers, and combination circuit breaker-transfer (bypass) switches. However, the same principles of construction and operation apply to substantially all switchgear. The principles of construction and operation of the present invention are shown in FIG. 1. Referring now to FIG. 1, shown is moving contact 16 retreating 28 from fixed contact 12 in response to a short circuit or fault condition with resulting arc 30. An insulating member, or insulating partition 18 preferably extends across the complete internal cross section of housing 11, partitioning housing 11 into two chambers, 15, 17 with only aperture 20 providing communication between the chambers. If communication between chambers 15, 17 is required, for example, for pressure equalization, a passage 39 distanced from aperture 20 that by virtue of placement and geometry inhibits passage of an arc may be provided in partition 18. Under conditions of high energy arcs where excessive pressures may be generated, suitable venting from chambers 15, 17 to the atmosphere may be provided.

During fault clearance, a time dependent energy imbalance may arise between cavities 15 and 17 due to arc energy dissipation. Appropriate geometries of cavities 15 and 17 may be devised such that internal pressure wave redirection, geometrically selective venting to the atmosphere of pressure waves, or other means may be employed that maintain predetermined operation of the arc extinguishing properties of the present invention. Means for bracing guillotine 24 against arc 30 induced shock waves may include a rigid plate structure affixed to partition 18 that slidably captures guillotine 24 between partition 18 and the plate structure.

A first movable insulating member 24 herein called a guillotine is in preferably intimate sliding contact with partition 18. The mating surfaces of partition 18 and guillotine 24 are smooth and flat to effectively provide a seal between the mating surfaces. In the open circuit condition where the moving contact 16 is spaced from the fixed contact 12 and guillotine 24 has covered aperture 20 the two chambers 15, 17 are effectively sealed off from each other. Under conditions of high pressures generated by high let-through energy, ($I^2t$), chambers 15, 17 may have vents to the atmosphere.

Partition 18 and guillotine 24 are preferably constructed of dielectric material with low tracking characteristics, for example, P.T.F.E., such as Teflon, P.M.M.A., PVC, polypropolene and polyester. Material with poorer tracking characteristics include polycarbonate, epoxy-silica resins, glass-epoxies and phenolic resin bonded paper. Alternatively, ceramics or ceramic composites, for example, $Al_2O_3$-25% SiC or Zirconia-Alumina may be employed. Tracking is the formation of a permanent, conducting path or track across the surface of an insulator caused by degradation of the insulating material, as, for example, may be caused by arcing. This generally leads to switchgear failure.

Figure 5:
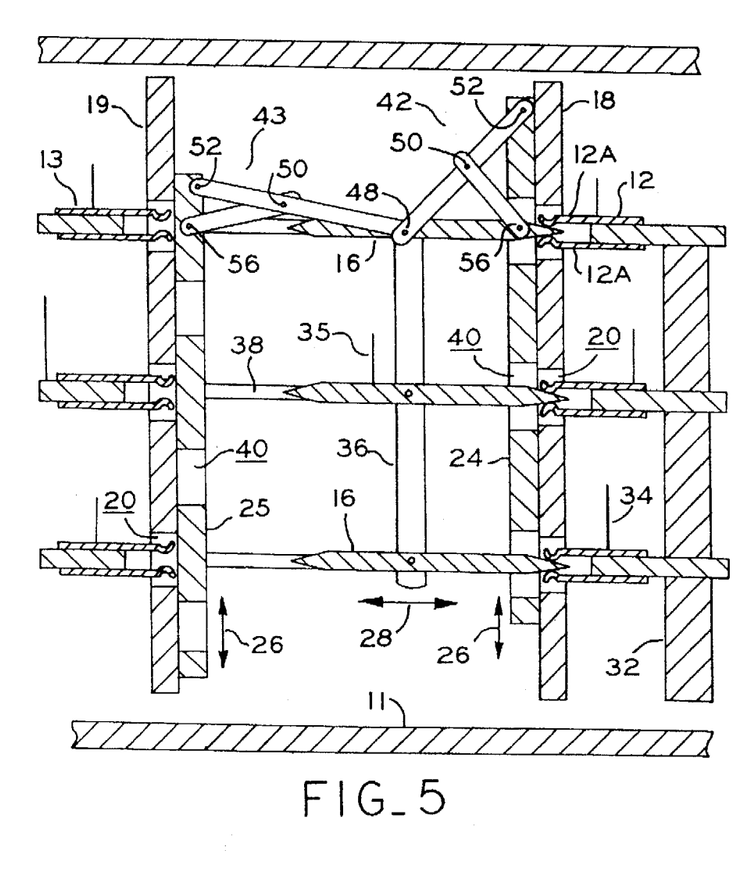
FIG. 5 is a cross section view of a multiphase combination circuit breaker transfer switch employing linear motion of the moving contact and guillotine.
Figure 6:
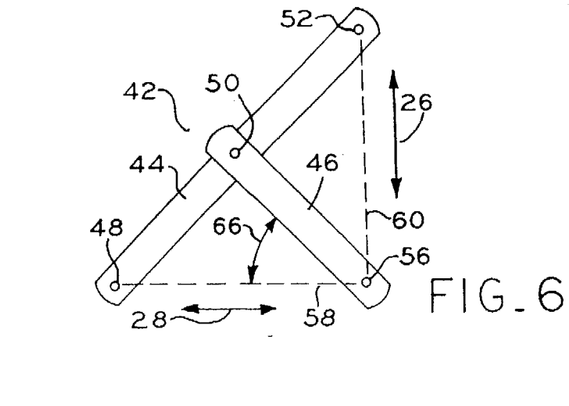
FIG. 6 is a side view of the linear mechanical linkage to simultaneously drive the movable contact and the guillotine.

Referring again to FIG. 1, linkage 42, shown in principal and described in more detail in FIGS. 5 and 6, is employed to couple moving contact 16 to guillotine 24 such that proper synchronization of movement takes place whereby guillotine 24 covers and extends beyond aperture 20 as contact 16 moves to the non-current carrying open circuit position, or a current-interrupting position. In the closed circuit position, or closed current carrying position, with contacts 12, 16 engaged, guillotine 24 has been raised by linkage 42 to expose aperture 20 in partition 18. Other means for coupling guillotine 24 and moving contact 16 may be employed, including separate mechanisms for guillotine 24, such as spring, pneumatically, hydraulically and electromagnetically. Contact 16 may also be electrically or mechanically driven, is suitably coupled by means, such as mechanical, electrical, electro-magnetic, pneumatic or hydraulic to provide the desired synchronous movement of contact 16 and guillotine 24.

A small force 41, from Be-Cu finger stock 51 for example, applied to guillotine 24 and transmitted orthogonal to the mating surfaces of partition 18 and guillotine 24 may be applied to insure that intimate contact is maintained between the sliding surfaces throughout all circuit opening and closing cycles. To further reduce sliding friction, where appropriate, and to provide a seal that can be substantially hermetic between the mating surfaces of 18 and 24, a suitably inert, non-conducting and high temperature lubricant suitable for use in the presence of arcs such as silicone or fluorocarbon oil may be used. This has the further benefit of increasing the dielectric strength of the partition 18 and guillotine 24 interface.

Figure 2:
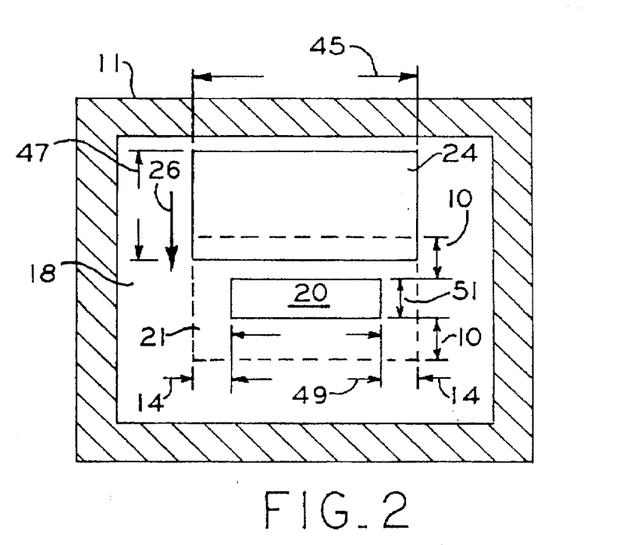
FIG. 2 is a cross section front view of the dielectric partition and guillotine.

Referring now to FIG. 2, the width 45 and length 47 dimensions of guillotine 24 are sufficiently larger than the width 49 and length 51 of aperture 20 such that there is sufficient overlap 14 and 10, shown in dotted outline 21, of the mating surfaces of guillotine 24 on partition 18 to prevent an arc propagating between the mating surfaces from contact 16 to contact 12 as guillotine 24 covers aperture 20 in reaching the open circuit position. This open circuit position is also shown in FIG. 1 in partial cross section with dotted lines 21. In the closed circuit condition when current is flowing, contacts 12 and 16 are engaged and guillotine 24 is distanced from aperture 20 as shown in the dotted outline 23, and as also shown 24 in the face on view of FIG. 2.

Referring again to FIG. 1, upon occurrence of a fault or other predetermined condition wherein the circuit must be opened and the flow of current interrupted, a mechanism, such as a conventional latch mechanism, commences to draw back movable contact 16 and disengage it from fixed contact 12 thereby interrupting the circuit. As contact 16 moves 28 away from contact 12, guillotine 24 proceeds to slide down the face of partition 18, as shown by arrow 26.

As edge 31 of guillotine 24 approaches aperture edge 33 of partition 18, arc 30 is pinched and then severed as edges 31 and 33 pass each other thereby sealing off chambers 15, 17 and extinguishing the arc. The guillotine 24 and partition 18 are the mechanical mechanism for the severing of arc 30, which ceases to exist, that is, it is extinguished. As long as the dielectric strength of partition 18 and guillotine 24 exceeds that of the applied voltage, the impedance between contacts 12 and 16 is effectively infinite and the arc cannot be maintained nor can it reignite. With a dielectric strength of 19 kV/mm, a 3 mm, about one eighth of an inch thick piece of Teflon can stand off about 50,000V, more than enough for most applications. Alternatively, a core structure of ceramic or other suitably rigid dielectric material may then be coated to a desired thickness, for example in the manner of frying pans, with Teflon or other suitable dielectric material. Further, all arc exposed surfaces could be formed from laminating such material. In addition to Teflon, other dielectric materials of construction of guillotine 24 and partition 18 include, for example, PMMA, Melamine, PVC and Polyester, which are described in "Power Circuit Breaker Theory and Design" edited by C. H. Flurscheim, Peter Peregrinus Ltd; 1982, hereinafter referred to as Flurscheim. Alternatively, ceramics of ceramic composites, including $Al_2O_3$-25% SiC or Zirconia-Alumina may be employed. In general, these dielectric materials have low tracking characteristics. That is, they have a low tendency to produce conductive surfaces under the action of electric arcs. The interposition of the high dielectric strength barrier enables a short stroke of the moving contacts to be obtained as the predominant electrical insulation is from the barrier. Instead of open circuit contact spacings measured in the 4 cm range, it is now about 1 cm. This short moving contact displacement permits compact switchgear size, and high speed make and break of contacts.

In the final open circuit resting position, moving contact 16 is spaced from guillotine 24 with guillotine 24 shown in partial dotted outline 21. Referring again to FIG. 2, the open circuit resting position of guillotine 24 is also shown in dotted outline 21 as covering aperture 20 with sufficient horizontal 14 and vertical 10 overlap on to partition 18 to prevent an arc from propagating through the intimate interface of 18 and 24 from contact 12 to contact 16.

Referring again to FIGS. 1 and 2, the finger 12 and blade 16 contact construction offers special benefits in systems having resistive and/or capacitive loads. Examples include electric and hybrid vehicles, LIPS systems and the DC link of adjustable speed drives, process control systems, and other electronic equipment. In these circumstances arcing is primarily during contact 12, 16 make and is generally composed of pre-arcing, which occurs just prior to contact make, and arcing during contact bounce which, for example, may be from about 1 millisecond to several milliseconds. Butt contacts are particularly prone to contact bounce due to both the mechanical forces of high speed contact impact and the current-induced electromagnetic "blow-off" forces which repel the contacts. Arcing during contact bounce can produce molten pools of contact metal that can cause contact welding upon contact closure with consequent failure of the circuit breaker or other switchgear.

Pre-arcing can be minimized with the use of properly designed arcing contacts, and finger and blade contact construction can substantially eliminate contact welding due to contact bounce. Finger and blade contact construction can provide current induced electromagnetic "blow-on" forces that tend to clamp the fingers 12A to the blade 16 upon contact in contrast to the repulsion forces of butt contacts. This arises because the current flow is now orthogonal to contact motion instead of being parallel as in butt contacts. The mechanical impact of the high speed impact of blade 16 on fingers 12A is to drive them apart to cause contact bounce. However, if the tapered 29 section of blade 16 is provided with a geometry such that under prescribed operating conditions the downward force 27, or biasing force, exerted by fingers 12A is greater than the opposing force 37 generated by the high velocity impact of blade 16 on fingers 12A then mechanically induced contact bounce is substantially eliminated. Thus, both the mechanical and electromagnetic causes of contact bounce and associated potential for contact welding may be substantially eliminated with the use of finger and blade construction of predetermined design.

In power circuit breakers the impact of butt contacts upon circuit make can generate loud and undesirable noises. Referring again to FIG. 1, the design of the blade 16 and fingers 12A geometry can be such as to generate low noise. The design of blade 16 taper 29, which may be a compound curve, is such that the angle of contact between taper 29 and the contact point of fingers 12A generates minimum noise. This may be calculated, in principle, in a manner similar to that for the design of silent submarine propellers. The balance of taper 29 is also designed to generate minimum noise as fingers 12A slides over it. For friction and low electrical resistance, the blade may be hard silver plated and the fingers soft silver plated. Taper 29 design is a function of, for example, blade 16 velocity, finger 12A spring characteristics, blade 16 and finger 12A contact surface properties, e.g. friction.

Figure 3:
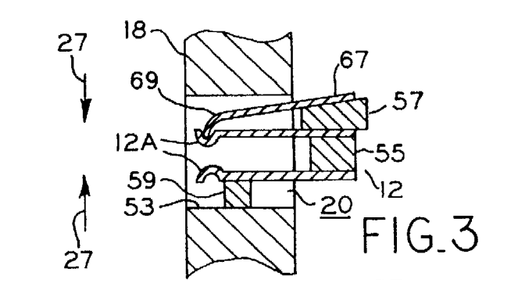
FIG. 3 is a cross section view of finger contacts employing alternate sources of contact spring force.

Referring now to FIG. 3, shown are alternate sources of force 27 to press fingers 12A against blade 16. Shown is spring 67, illustrated here as made from thin steel sheet stock mounted on spacer 57 which is preferably an electrical insulator. Spring 67 may be constructed of a metal sheet of at least one of magnetic or non-magnetic material. In accordance with one embodiment, spring 67 is constructed of non-magnetic material such as beryllium copper or phosphor-bronze. In general, it is desirable that little or no current flow through magnetic members. Electrical insulator 57 substantially isolates one end of spring 67. Though shown on one side, spring 67 and spacer 57 may be mounted on opposing sets of fingers 12A. Alternately, the force 27 may be supplied by resilient strip 59 made, for example, from a high temperature elastomer such as silicon rubber of suitable durometer. Elastomer 59 presses on one side against fingers 12A and on the other side against the upper (not shown) and lower 53 surfaces of aperture 20.

Figure 4:
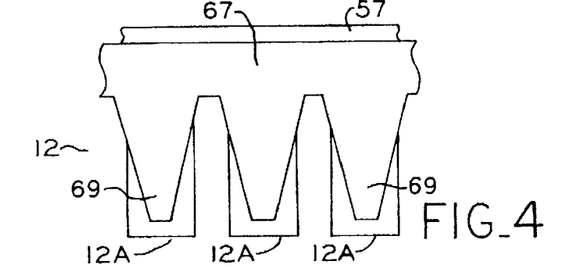
FIG. 4 is a top down view of finger contacts employing alternate sources of contact spring force.

Referring now to FIG. 4, shown is a partial top down view illustrating multiple individual spring fingers 69 wherein at least one spring finger 69 presses down on each of multiple contact fingers 12A thereby providing an independent force 27 for each finger 12. Spring fingers 69 are shown, by way of example, as being tapered so as to provide uniform deflection along its length. For a given total force 27, multiple finger 12A construction improves the current carrying capability by a factor of $(N^{1/2})$ where (N) is the number of contacts. Spring 67 and fingers 69, as well as contact fingers 12A may, for example, be fabricated by chemical milling, stamping, or by ganged slotting of stacked pieces. The use of spring 67 or elastomer 59 as the source of force 27 enables fingers 12A to be made of high conductivity copper, silver or other suitable conductors which is particularly important in high current applications.

Referring now to FIG. 5, shown is a further embodiment of FIGS. 1 and 2 as might be used in multiphase switchgear, for example, three phase. The motion of moving contacts 16 and guillotine 24 are substantially linear and substantially orthogonal to each other, as shown in FIGS. 1 and 2 and explained in FIG. 6.

Referring again to FIG. 5, partition 18 is now provided with three spaced apart apertures 20. Each aperture is provided with a fixed contact 12, one for each phase. Contacts 12 may be mounted on and separated by spacing insulators 32 to provide rigidity and alignment. Leads 34 attached to contacts 12 pass through enclosure 11 to outside lugs. Three moving contacts 16 are provided to mate with three fixed contacts 12. Leads 35 attached to contacts 16 are attached to external lugs (not shown). Contacts 16 are linked by electrically insulating arm 36 so as to move in unison. Suitable alignment means such as grooves or rails 38 are provided in opposing walls of housing 11 to guide moving contacts 16 to mate with fixed contacts 12 in the closed circuit position. Guillotine 24 is provided with three apertures 40, which when aligned with apertures 20 allow moving contacts 16 to penetrate in order to mate with fixed contacts 12. Mechanical linkage 42 is provided to couple the movement of moving contacts 16 with guillotine 24 such that when contacts 16 have engaged contacts 12 apertures 40 of guillotine 24 are aligned with apertures 20 of partition 18 thereby permitting union of contacts 16 and 12.

Upon sensing a fault condition, a suitable latch mechanism (not shown), which may be spring, magnetically, pneumatically or otherwise activated, causes contacts 16 to substantially simultaneously disengage from contacts 12 and retreat while guillotine 24 slides down on partition 18 and seals off aperture 20, as in FIG. 1, thereby substantially simultaneously quenching the arcs of all three legs of the three phase system.

The design of mechanisms for operation of switchgear are well known and are described in Flurscheim. Closing mechanisms may be, for example, spring, solenoid or pneumatic powered. Tripping mechanism and mechanical linkages may, for example, be a double-toggle closing mechanism with latch and trip catch, a cam operated closing mechanism with latch and trip catch, a high-speed tripping mechanism latch type, or a high-speed tripping mechanism electrically held type. Detection of fault conditions may be, for example, electromagnetically or thermally, the methods of construction and execution being well known in the art. Any of the above or other suitable mechanisms well known in the art may be employed in the present invention.

Referring now to FIG. 6, linkage 42 consists of two strips of metal 44, 46. Strip 44 has three holes with pins 48, 50, 52. The spacing 54 between pins 48 and 50 is the same as that between 50 and 52. Metal strip 46 has the same two holes 56 and 50 with the spacing 54 between holes 50 and 56 equal to that of 48 and 50, and 50 and 52. By simple trigonometric analysis, it can be shown that, with pin 56 as the fixed pivot point, if pin 48 travels a straight line 58 through pin 56, then pin 52 will travel in a straight line 60 at exactly 90 to line 58.

Referring again to FIG. 5, it is seen that as moving contact 16 moves toward fixed contact 12, linkage 42 will cause guillotine 24 to rise, the motion being orthogonal to the movement of contact 16. This linear movement combined with pressure 41 as shown in FIG. 1, on guillotine 24 insures that guillotine 24 remains flush against partition 18 during the entire upward and downward motion thereby insuring that the arc cannot find a gap in the interface of 18 and 24 to penetrate through.

A further improvement in the embodiment of FIG. 5 is to incorporate a transfer switch, often called bypass, into the circuit breaker. This has important benefits in application to adjustable speed drives (ASDs) for electric motors, uninterruptable power supplies or power conditioning systems, process controls and like systems where if there is a failure in the converter or inverter, there is an automatic switch over to direct line power or other alternate power source with essentially no loss of function. Alternatively, the bypass may be employed to dissipate stored load energy under fault conditions. For example, should a fault occur in a motor or other inductive load, the stored energy can be considerable. In normal circumstances as this stored energy is dissipated in the arc chute and contacts, often shortening circuit breaker life or resulting in effective destruction of the circuit breaker. With the bypass contact, the surplus energy may be directed away from the contacts to spark gaps, resistor and capacitor networks, or other suitably designed loads where the energy may be dissipated harmlessly. This dual capability normally comes at considerable cost. In the present invention, the added cost is nominal.

Referring again to FIG. 5 where bypass capability has been built into a circuit breaker. Leads 35 to moving contacts 16 bring in the incoming line power. Fixed contacts 12 through lines 34 direct line power to the load, for example, converters of systems such as ASDs, UPS and power conditioning. Opposing fixed contacts 13 through lines 61 direct alternate power, for example, around the ASDs, UPSs and power conditioning systems directly to the motors, process control equipment, computers etc. upon failure of the ASDs, UPSs and power conditioning systems. Thus, while repairs are being made, the end equipment is still functioning. Alternatively, upon failure of the load, such as a motor, contacts 13 may be attached to a power dissipating load.

Again referring to FIG. 5, a substantially identical set of parts to guillotine 24, partition 18 and fixed contacts 12 comprising guillotine 25, partition 19 and fixed contacts 13 are set up in substantially mirror image fashion opposing 24, 18 and 12. A second linkage 43 that is substantially identical to 42 is provided. With contacts 16 centered, a slice down the center yields a substantially mirror image construction. Linkages 42 and 43 share pin 48 on moving contact 16 in common such that all motions are coupled. As can be seen, when moving contacts 16 have engaged contacts 12 in the current conducting closed circuit condition, apertures 40 of guillotine 24 align with apertures 20 of partition 18. At the same time guillotine 25 has sealed off apertures 20 of partition 19 containing bypass contacts 13 in the nonconducting current interrupted open circuit condition.

Upon a fault condition, contacts 16 disengages from contact 12 and retreat along rail 38 driven by, for example, springs, electromagnets and pneumatically. As contacts 16 retreat, linkage 42 causes guillotine 24 to fall and seal off apertures 20 and quench the arcs as illustrated in FIG. 1. Simultaneously, linkage 43, which shares common pin 48 with linkage 42 on moving contacts 16, is generating an opposite action by causing guillotine 25 to rise such that aperture 40 will align with apertures 20 of partition 19 thereby enabling contacts 16 to mate with contacts 13 to close the bypass circuit which completes the power transfer or bypass. This method is unambiguous; it insures that only one of contact 12 or 13 are closed. There is no way both 12 and 13 could be closed simultaneously for a potentially disastrous short circuit. Substantially precise synchronism of contact closure and opening may be achieved. The basic principles of operation of linkage 42 may be applied to substantially all embodiments of the present invention.

A further alternative, for example, in case of end equipment failure, such as a motor, a lockout may be provided, such as a pin (not shown) that intercepts and stops moveable contact 16 at an intermediate position between contacts 12 and 13 such that guillotines 24, 25 cover apertures 20 in partitions 18, 19. In this manner, both circuits containing contacts 12 and 13 are in the open circuit condition with a total interruption of current flow. This capability may be incorporated into all embodiments of the present invention.

Figures 7, 8, 9, 12:
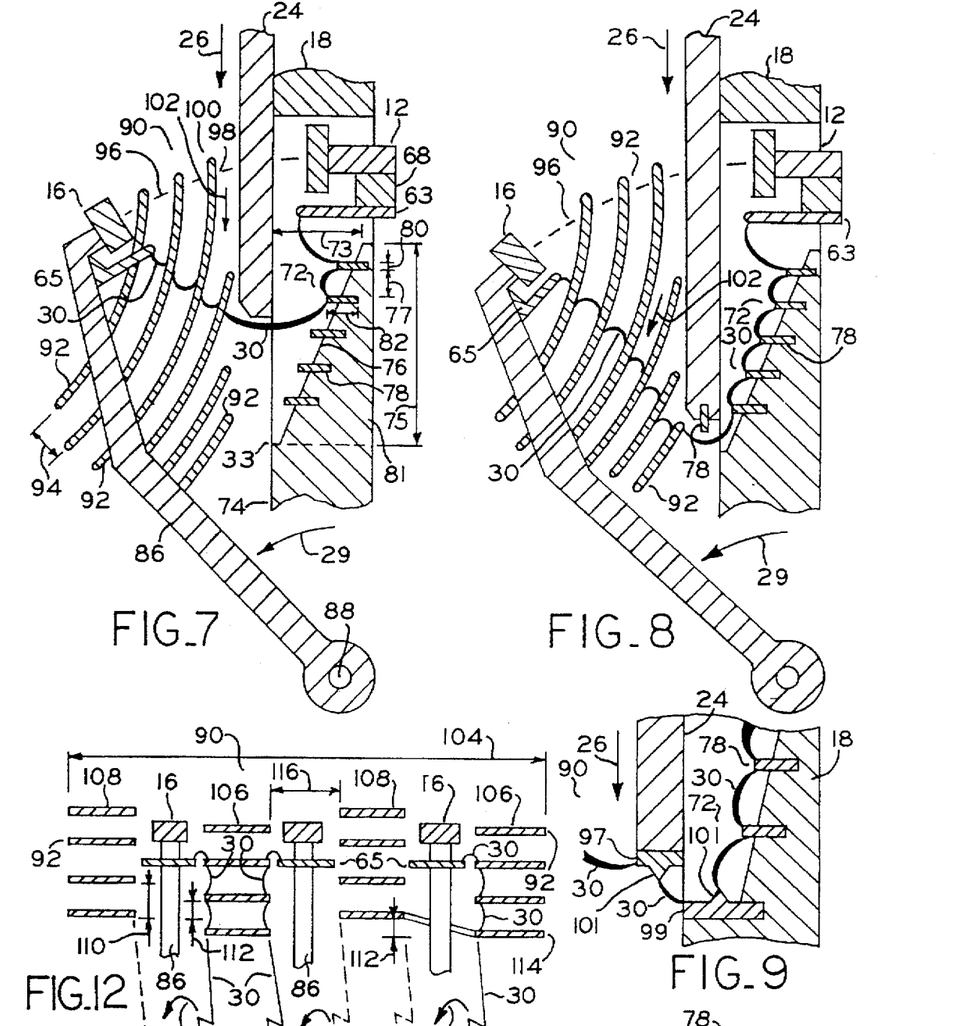
FIG. 7 is a cross section view of the guillotine and partition with separate arc chutes on the fixed butt contact and moving butt contact side of the guillotine illustrating arcing during fault clearing
FIG. 8 illustrates the arc coupled to all cold cathode plates shown in FIG. 7 just prior to arc severance.
FIG. 9 is a partial cross section view of the arc severing region of FIG. 7 prior to arc severance to illustrate incorporation of conductive bars in the guillotine and partition to reduce arc induced erosion.
FIG. 12 is a cross section view of multiple paralleled moving contacts bracketed by arc chute cold cathode plates with the cold cathode plate shown in FIG. 11 positioned to illustrate the path of arcs from the arc chute on the fixed contact side of the guillotine to the arc chute on the moving contact side of the guillotine.
Figure 11:
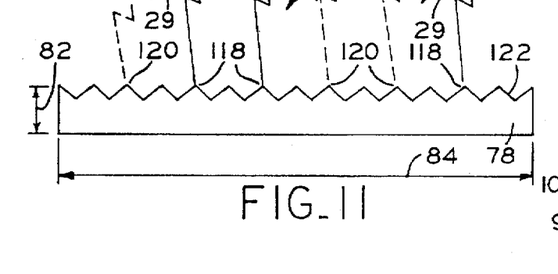
FIG. 11 is a top down view of a cold cathode plate from the arc chute on the fixed anode side of the guillotine.

Referring now to FIG. 7, shown is the guillotine 24 and partition 18 construction described in FIGS. 1 and 2. Fixed contact 12 is now of the butt contact type and may have electrically and mechanically mounted 68 to it a fixed arcing contact 63. An arc chute 72 is provided by cutting back the partition 18 from the guillotine 24-partition 18 interface surface 74, here shown in a generally triangular form in cross section but which may have any arbitrary shape, such as rectangular or curved. Arc chute 72 may be independently fabricated as assembly 81 and mounted in the opening in partition 18 as shown. Insulator surface 76 of arc chute 72 may be prepared with cooling and/or deionizing gas producing material. Upon heating by the hot arc, cooling and/or deionizing gases are produced from surface 76. With the descending 26 guillotine 24, an enclosed space is formed with arc chute 72 geometry. The geometry of the space provides spatial control of the arc impedance, that is, squeezing the arc into a narrow space increases the arc impedance and in this manner contributes to current limiting. This insulating wall 76 of the arc chute 72 have suitably spaced apart 77 cold cathode plates 78, sometimes called plates, of thickness 80 and width 82 which may, for example, range from about 0.2 mm to 5 mm in thickness 80 and from about 3 mm to 30 mm in width. Plates 78 may be made of magnetic metal, such as steel, or other suitable metal. Referring now to FIG. 11, shown is cold cathode plate 78 having a length 84. Alternatively, plates may be of "U" or "H" geometries with, in general, each contact 12 having at least one set of plates 78 associated with it.

Referring again to FIG. 7, cold cathode plates 78 are shown mounted in the recessed wall surface 76 of partition 18 with the arc chute 72 having a length 75 and depth 73 tapering to a small value at edge 33 where it merges with the partition 18 -guillotine 24 interface surface 74. As depth 73 decreases toward zero at edge 33, the arc-impedance increases. Other cross section shapes of arc chute 72, such as rectangular or curved, provide different arc impedance characteristics with varying distance along arc chute length 75. This provides spatial control of the arc impedance and its associated current limiting characteristics.

Referring again to FIG. 7, moving butt contact 16 may also be fitted with a movable arcing contact 65. Moving contact 16 is affixed to arm 86 which pivots about fixed axis 88. Linkage (not shown) which may function in a manner similar to that described in FIGS. 5 and 6 may be employed to couple the guillotine 24 and moving contact 16. Mechanical linkage design is well-known in the art and suitable examples may be found in the four volume set "Ingenious Mechanisms" published by Industrial Press Inc. NY, N.Y., hereinafter referred to as Ingenious Mechanisms.

Referring again to FIG. 7, a second arc chute 90 may be prepared on the moving contact side of guillotine 24. Arc chute 90 comprises spaced apart 94 cold cathode plates 92, sometimes called plates, suitably mounted and positioned such that plates 92 do not interfere with the motion of guillotine 24. Cold cathode plates 92 are formed into optimum geometries, shown here by way of example as being curved. The geometry and placement of plates 92 are intended to enable the maximum number of plates 92 to be employed for a given arc chute 90 geometry to maximize the total arc voltage drop for a given moving contact 16 stroke. This maximizes current limiting and correspondingly minimizes let through energy ($I^2t$). In general, the optimum geometry of plates 92 is such that a line joining moving arcing contact 70 with the lower edge of guillotine 24 intercepting the arc 30 is orthogonal to the surfaces of successive plates 92. As moving contact 16 travels path 96 and guillotine 24 travels 26 down, a complex surface for plates 92 is described, for example, curved as illustrated. In this way the maximum number of plates 92 suitably spaced 94 apart may be employed for a given line length between moving arcing contact 65 and the lower arc intercepting edge of guillotine 24.

The path 96 of moving contact 16 is shown as it rotates 29 about fixed axis 88 away from fixed contact 12 upon a fault condition. As moving contact 16 moves away from fixed contact 12 the first arc struck from arcing contact 65 to arc chute 90 is in the vicinity of the point 98 on plate 100. This is about the same time that guillotine 24 engages arc 30 and commences to stretch it. As contact 16 continues to move along arc path 96 away from contact 12, guillotine 24 pushes down 26 on arc 30 stretching it. As guillotine 24 moves down 26, arc 30 attaches itself progressively to cold cathode plates 78 on the fixed contact 12 side of guillotine 24. At the same time arc 30 is progressively moving down 102 plates 92 even as the arc 30 is engaging additional plates 92. This has the twofold benefit of progressively increasing the arc 30 voltage drop with the increasing number of plates 92 engaging arc 30, and with the arc forced to travel down 102 the plates 92 from combined contact 16 and guillotine 24 movement, the overheating of plates 92 resulting from a stationary arc is avoided.

Referring now to FIG. 8, guillotine 24 is shown in position just prior to severance of the arc 30 at lower edge 33 of arc chute 72. All cold cathode plates 78 of arc chute 72 and plates 92 of arc chute 90 are shown as engaging arc 30 with each plate providing an arc voltage drop typically in excess of 20V each. Guillotine 24 may be fitted with one or more cold cathode plates 78 along the edge that interacts with arc 30. This provides further control of arc 30 placement along the arc intercepting edge of guillotine 24 as the arc traverses the gap between arc chutes 90 and 72, and further provides additional stages of cold cathode plate voltage drop. Depending on the arc chute design and mode of operation, plates 78, 92 may be magnetic such as steel or non-magnetic such as copper, or a suitable combination of magnetic and non-magnetic. In the various embodiments of the present invention, the motion of guillotine 24 edge 31, or arc severing edge, sliding past partition 18 aperture 20 edge 33 is similar to that of the cutting edges of a scissors. First the arc 30 is pinched or compressed at edges 31, 33 and as edges 31, 33 pass each other isolating the fixed contact 12 from the moving contact 16, the arc is extinguished.

Figure 10:
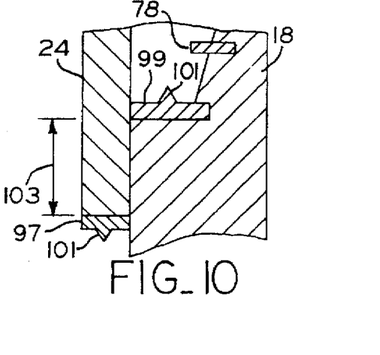
FIG. 10 is FIG. 9 after arc severance with the guillotine in the resting, open circuit position.

Referring now to FIGS. 9 and 10, FIG. 9 illustrates guillotine 24 fitted with metal bar 97 which extends substantially the width 45 of guillotine 24 (FIG. 2). Referring again to FIG. 9, the arc severing edge 33 of aperture 20 of partition 18 is also fitted with a metal bar 99 which extends substantially the full width 49 of aperture 20 (FIG. 2) Bars 97, 99 may be prepared with raised edges 101 extending widths 45, 49. Bars 97, 99 tend to anchor arc 30 and serve to keep arc 30 away from the dielectric material of guillotine 24 and partition 18 for most of the arcing period. Bars 97, 99 may be magnetic such as steel, non-magnetic such as copper, tungsten, Molybdenum, W-CU, Mo-Cu or W-AG, or diamagnetic. Alternatively, when partition 18 and guillotine 24 are made of plastic, such as Teflon or Melimine, bars 99, 101 may be made of a suitable ceramic or ceramic composite such as $Al_2O_3$-25% SiC or Zirconia-Alumina. Referring again to FIG. 9, arc 30 now progresses from plate 78 of arc chute 72 to edge 101 of bar 99 and thence to edge 101 of bar 97 and on to plates of arc chute 90. In this manner, dielectric edge 31 of guillotine 24 and dielectric edge 33 of aperture 20 are subject to minimal arc erosion. As bars 97, 99 approach and move 26 past each other, arc 30 between the bars 97, 99 is effectively shorted out. Means, such as conductive resilient fingers, may be provided such that bars 97, 99 touch each other, or bars 97, 99 may be maintained in very close proximity to each other. Once bars 97, 99 are past each other, the dielectric material of guillotine 24 and partition 18 oppose each other and increasingly isolate and insulate both bars 97, 99 and contacts 16, 12 from each other thereby extinguishing arc 30.

Referring now to FIG. 10, shown is guillotine 24 in its resting, open circuit position. Bars 97, 99 have moved past each other to their final open circuit resting place with sufficient dielectric overlap 103 of guillotine 24 and partition 18 so as to provide needed voltage isolation between bars 97, 99.

Referring again to FIG. 8, arcs follow the path of least resistance, that is, lowest impedance, minimum energy. In general the path of lowest impedance is a straight line, however, hot convective air currents, nearby dielectric surfaces and other factors can cause arcs to strike out in unexpected directions. The illustrated curved geometry of plates 92 is intended to indicate the maximum number that can be accommodated within the space of arc chute 90 while providing adequate insulation between plates 92. The arcs 30 are essentially orthogonal from the surface of one plate 92 to the next thereby following the path of least resistance, that is minimum energy. In general, it is this effect that drags down 102 the arcs 30 on plates 92 as guillotine 24 moves down 26 and moving contact 16 follows path 96. The energy contained in an arc can be quite large and at higher currents contacts 16, 12 may be provided with arcing contacts 63, 65 to minimize erosion of contacts 16, 12. In general, it is not desirable to have an arc dwell for a prolonged period on a single point on plates 78, 92 as overheating and melting can take place with consequent potential for damage.

Referring now to FIG. 12 which is a face on cross section of contacts 16, 108 and cold cathode plates 92. Shown is arc chute 90 construction which further reduces the dwell time of arc 30 at any given point on arc chute plates 92. Multiple paralleled contacts 16 with intermediate arc chute plates 92 are shown for high current operation. The width 104 of arc chute 90 and contacts 16 assembly is generally about the same as width 84 of plates 78 of arc chute 72. Moving multiple contacts 16 pivot 29 synchronously to mate substantially simultaneously with a corresponding number of fixed contacts 12. The cross section of plates 92 are seen as columns 106, 108 bracketing contacts 16. Columns 106 and 108 are displaced vertically with respect to each other with the plates 92 of column 106 being intermediate to plates 92 of column 108. With the vertical spacing of opposing plates 92 in column 106 being 110, than the vertical position of a plate 92 in column 108 would be intermediate 112 and preferably half way.

Plates 92 of columns 106, 108 may be individual, or may be "U" or "H" shaped plates 114 with one leg displaced the distance 112. One leg of plate 114 corresponds to column 106 and the other leg corresponds to column 108. The vertical displacement 112 of columns 106 relative to column 108 contributes to arc 30 instability by periodically switching arc 30 from column 106 to column 108. This shifting of the arc 30 has important ramifications of the stationary dwell time of arc 30 on plates 78 in arc chute 72 in FIG. 7.

Referring again to FIG. 12, as moving contact 16 sweeps through arc chute 90 along path 96, arcing contact 65 will arc to the closest plate, that is, the path of least resistance, here shown as plates 92 in column 106. The arc 30 is then seen as progressively arcing across successive plates 92 in column 106 and spanning the gap between the plates 92 of arc chute 90 and the plates 78 of arc chute 72 as shown in FIGS. 11 and 12. Plate 78 of FIG. 11 is shown having the same relative position along the length axis 84 with the respect to plates 92 of arc chute 90 of FIG. 12 along its length axis 104 as plates 78 and 92 in FIG. 7. Referring again to FIG. 12, as arcing contact 65 traverses a vertical distance 112 which now places it adjacent a plate 92 in column 108, the arc 30 shifts from column 106 to column 108 which now constitutes the lowest impedance path. The arc 30 now progressively arcs across the plates 92 of column 108 and crossing the gap to plate 78 of arc chute 72. In addition, the arc 30 has transferred from one side of arcing contact 65 to the other, that is, from the side adjacent column 106 to the side adjacent column 108. This lowers localized heating.

Referring again to FIGS. 11 and 12, what has occurred is that the arc has shifted a distance approximately equal to the spacing 116 between columns 106 and 108. In general, when spacing 110 between adjacent plates 92 is less than the spacing 116 between columns 106 and 108, arc 30 propagation will be from plate 92 to plate 92 and not between columns 106 and 108 because the impedance between opposing plates 92 is lower because the arc seeks the lowest impedance path which generally is a straight line. When the arc 30 leaves the last plate 92 and traverses the gap between arc chutes 90 and 72, the arc 30 will generally terminate on the closest point 118 on plate 78. When the arc 30 shifts from column 106 to 108 and shifts a distance 116, the arc 30, in order to maintain a minimum energy condition, that is, the shortest distance, will also shift about a distance 116 to point 120 on plate 78. Thus, as arcing contact 65 sweeps through arc chute 90, the arc 30 will oscillate back and forth between columns 106 and 108, and correspondingly, the arc 30 will sweep back and forth between points 118 and 120 on plate 78 thereby minimizing arc dwell time at any point on plate 78. Thus, localized heating is minimized on plates 78 and further reduced on plates 92. This method provides controlled arc instability for the purpose of minimizing arc induced heating of plates 78, 92 and arcing contacts 63, 65, or contacts 16, 12. In general, arcs tend to coalesce in a gas, such as air, and thus a single arc may be formed instead of the three described above. However, the arc movement provided by the above described arc chute 90 geometry would still function, there now tending to be one arc instead of three. This may be accommodated by having further relative vertical offsets of plates 92 in columns 106, 108 such that only one of the three shown arcing contacts 65 is in close proximity to a plate 92 and arcing to it at any given instant. In this manner the single arc progressively shifts from one contact 64 to the others in succession thereby obtaining much the same benefit as before.

Referring again to FIG. 11, cold cathode plates 78 may be prepared with periodic protuberances 122, here shows as triangular but which may be any geometry such as rounded. The protrusion 122 edges serve to provide anchors for arc 30 such that when the arc emanates from column 106, it will fasten on protrusion 118 which is the shortest distance, and thus the lowest impedance for the arc 30 from column 106. When the arc 30 emanates from plate 92 column 108, the closest distance is to point 120 and so the arc will tend to move there. Thus, the arc oscillates back and forth between predetermined points such as 118 and 120 on plates 78 minimizing localized heating. Protuberances 122 are of sufficiently small size for the geometries employed that arc 30 does not remain locked on point 118 when arc 30 shifts from plate 92 column 106 to column 108, but shifts readily to point 120. Protuberances 122 may be fabricated by, for example, chemical milling, stamping, EDM and ganged cutting blade milling of stacked plates. Plates 78, 92 and arcing contacts 63, 65 may employ protuberances.

Figure 13:
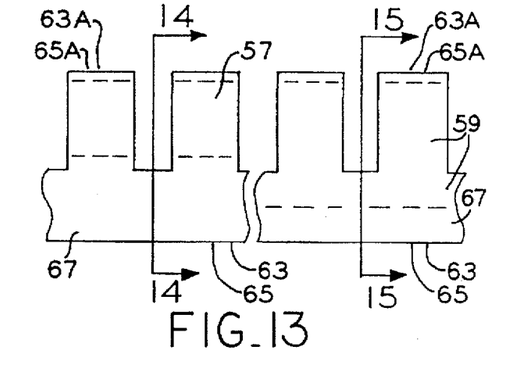
FIG. 13 is a top down view of arcing contacts having magnetic material laminated to conductive metal.
Figure 14:
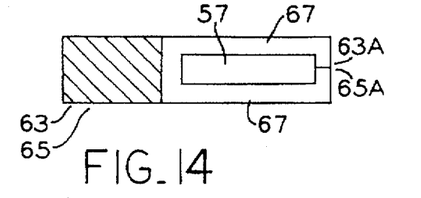
FIG. 14 is a cross section of the contact shown in FIG. 13 with separate strips of magnetic material in each finger.
Figure 15:
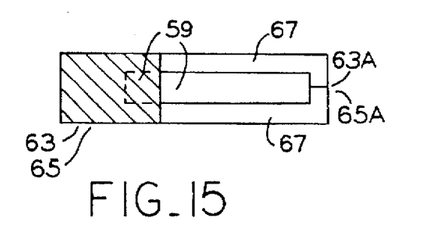
FIG. 15 is a cross section of the contacts shown in FIG. 13 with a single strip of magnetic material.

Referring now to FIGS. 13, 14 and 15, further means are shown to sweep arc 30 back and forth along a horizontal line as shown in FIGS. 11 and 12. Referring now to FIG. 13, shown is a top down view of arcing contacts 63, 65 shown as being slotted and having fingers 63A and 65A. Fingers 63A and 65A may have widths and spacings comparable to fingers 12A of FIG. 4. Arcing contacts 63, 65 may comprise, for example, a layer of magnetic material 57 or 59, such as steel, which have a high conductivity metal, such as copper, silver, molybdenum, tungsten, Cu-W or Cu-Mo 67, laminated to both surfaces of magnetic metal 57 and 59. Methods to obtain intimate electrical and thermal contact between metals 67, 57 and 59 include cladding and brazing. In FIG. 14 the magnetic material is only contained in each finger 63A, 65A with no direct magnetic path to adjacent fingers. In FIG. 15, the magnetic material 59 is shown as a continuous strip with cut-outs corresponding to finger geometries 63A, 65A thereby providing a continuous magnetic path between adjacent fingers 63A, 65A. Metal 67 is laminated to both surfaces of magnetic material 57, 59 to provide a high electrical and high thermal conductivity path. In addition, laminating both sides of material 57, 59 with metal 67 of appropriate thicknesses serves to substantially eliminate any bending of fingers 63A, 65A due to the bimetallic effect during heating caused by arc 30.

When arc 30 transfers from contacts 16, 12 to arcing contacts 63, 65, as illustrated in FIG. 7, the arc will terminate on one each of fingers 63A, 65A corresponding to the lowest impedance path. The magnetic properties of the magnetic material 57 and 59 in fingers 63A, 65A enhance the attraction of arc 30 to fingers 63A, 65A. The two fingers, one each of 63A and 65A engaged by arc 30 quickly heat up causing the temperatures of each finger to approach the Curie temperature of the magnetic material 57. As the Curie temperature is approached, that is, the temperature at which a magnetic material loses substantially all magnetic properties and becomes substantially non-magnetic, the arc 30 then becomes attracted to a second pair of nearby fingers 63A, 65A that are cooler and which have remained magnetic. Upon the arc 30 leaving the first pair of fingers 63A, 65A cooling through metal layers 67, such as copper, commences to lower the temperature of magnetic material 57 bringing it below the Curie temperature and restoring its magnetic properties making it again attractive to arc 30. In this manner arc 30 is caused to sweep rapidly from first finger 63A to nearby second finger 63A, and in like manner, from first finger 65A to nearby second finger 65A. With multiple fingers 63A and 65A to distribute the heat load, overheating of any one pair of fingers 63A, 65A may be substantially avoided. With appropriate design, arc 30 is caused to interact with all fingers 63A, 65A. A wide variety of arcing contact 63, 65, design parameters that influence the arc sweeping rate are available. These include magnetic material 57 Curie temperatures, magnetic permeability, saturation, thickness and material, and thickness for metal layers 67 which determines rate of finger 63A, 65A cooling, and geometry of fingers 63A, 65A here shown as rectangular but which may have other geometries. Alternatively, the constructions described for fingers 63A, 65A may be suitably incorporated into contacts 16, 12.

Figure 16:
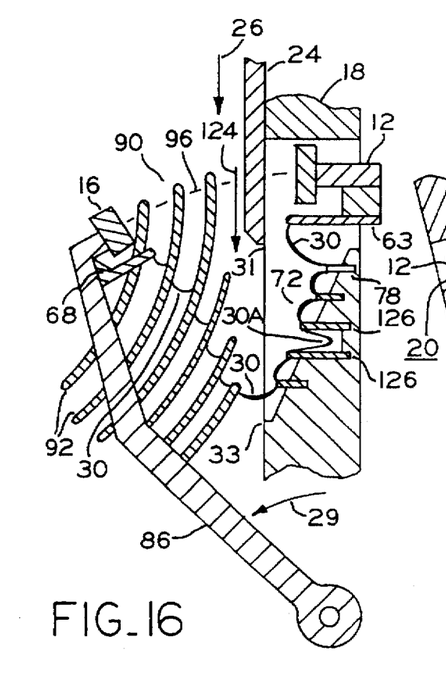
FIG. 16 illustrates structure shown in FIG. 7 wherein magnetic fields from fault currents are employed advantageously to force the arc toward its severance point ahead of the guillotine.

Methods to employ magnetic fields to force arc movement in a predetermined direction include magnetic blow out structures employing an arrangement of the leads or series connected coils wherein magnetic fields transverse to the arc generate a force ($\bar{J} \times \bar{B}$) such as 124, FIG. 16 that lengthens the arc and, for example, forces it into a quenching chamber. Referring now to FIG. 16, one embodiment of the above in the present invention would have the magnetic field force 124 lengthen the arc 30 in the direction of guillotine 24 movement 26 and also cause arc 30 to engage plates 78, 92. Force 124 effectively replaces the guillotine 24 in forcing the arc 30 down toward the severance edge 33 of partition 18. This has the dual benefits of minimizing erosion of guillotine 24 and causing more rapid engagement of plates 78, 92 thereby more quickly providing a higher arc voltage drop with consequent reduction in let-through energy ($I^2t$). Further arc 30 control may be obtained by the advantageous placement of arc runners which are extensions of the contact 12, 16 structures and which serve, for example, to quickly channel the arc 30 into the arc chutes 72, 90 away from the contact region and to quickly establish the arc in a non-contact region to prolong contact 12, 16 life.

For direct current (DC) applications, strong series magnetic fields and insulated metal or non-metallic arc chutes may be adapted to the present invention to lengthen and cool the arc 30 prior to severance. Other techniques to produce the desired magnetic fields include configuring the current carrying leads into one or more loops combined with outer iron plates, such as 78, 92 to direct the arc in a predetermined direction. This configuration may also employ narrow spaced apart copper plates, such as 78, 92 to cause rapid circular movement of the arc 30 thereby preventing the melting or vaporizing of the copper plates and to improve the dielectric recovery of the cold cathode arcs. Arc chute plates 78, 92 whether insulating such as ceramic, magnetic such as steel or non-magnetic such as copper, and, for example, "U" or "H" shaped, may be employed in all embodiments of the present invention. The theory and concepts of construction of the various arc control means employed in circuit breakers and other switchgear that may be redesigned or modified for use in the present invention are well-known in the art and, for example, may be found in "Circuit Interruption" and references cited therein, edited by T. E. Browne Jr., Marcel Dekker, NY, N.Y., 1984, hereinafter referred to as Browne.

To provide further improved current limiting, high speed contact 12, 16 parting is advantageous. Methods that may be employed include, for example, kicker solenoids and contact arm repulsion as described in Browne. A further method, as described in Browne, to obtain more rapid contact 12, 16 parting employs slot motor construction.

Referring again to FIG. 16, moving contact 16 is parting from fixed contact 12 under a fault condition and is shown at a point in time similar to FIG. 7. Here the $\bar{J} \times \bar{B}$ force 124 acting on arc 30 is substantially in the same direction as guillotine 24 motion 26 and has forced arc 30 down close to the arc severance point 33 of partition 18 ahead of guillotine 24. The interaction and disposition of force 124 on arc 30 is such as to encourage arc 30 to attach to plates 78, 92 to obtain maximum arc voltage drop. Thus, arc 30 is in position to be mechanically severed upon the coincidence of guillotine 24 edge 31 and partition 18 edge 33 before guillotine 24 edge 31 reaches partition 18 edge 33. This minimizes arc 30 erosion of guillotine 24 and more rapidly establishes maximum arc voltage drop and thereby minimizes let-through energy ($I^2t$).

Referring again to FIG. 16, arc chute insulated plate 126 geometry illustrates the arc 30A driven by $\bar{J} \times \bar{B}$ forces into the narrow space between barrier walls of refractory or semi-refractory insulating material which may be, for example, ceramics such as Alumina, Zircon, Mullite, Aluminum Carbide, AlN and Silicon Carbide. This cools and stretches arc 30A increasing its impedance and consequent voltage drop.

Figure 17:
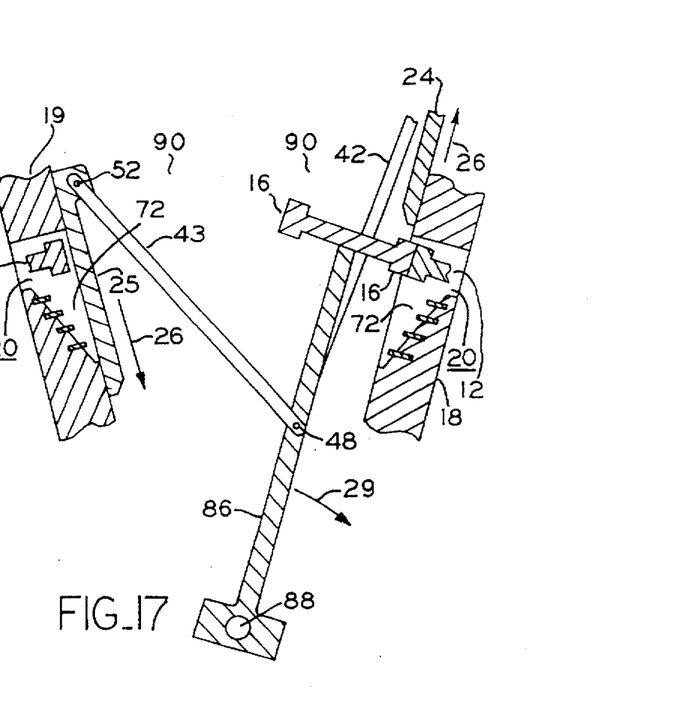
FIG. 17 illustrates structure shown in FIG. 7 configured as a transfer switch.

Referring now to FIG. 17, shown is a transfer switch similar in intent and function to that shown in FIGS. 5 and 6. A single pole is illustrated instead of three poles as in FIG. 5. Instead of the linear motion blade 16 contact of FIG. 5, rotating 29 motion of butt contact 16 is shown in FIG. 17. Referring again to FIG. 17, moving butt contact 16 is mated with fixed butt contact 12 of partition 18 thereby comprising the current carrying closed circuit position for the primary contact composed of guillotine 24, partition 18 and fixed contact 12. Guillotine 24 has been raised by linkage 42 thereby uncovering aperture 20 in partition 18 which enables the mating of contacts 16, 12. With contacts 16, 12 of partition 18 mated in the closed circuit position, contact 12 in partition 19 of the secondary contact has been covered and isolated by guillotine 25 by linkage 43 in the open circuit, non-current carrying position. Arc chutes 72 and 90, not shown for clarity purposes, as described in FIGS. 7 and 8 may be incorporated into FIG. 17, and would perform substantially the same function.

Upon a fault condition, contact 16 disengages from primary contact 12 in partition 18 and moves away while linkage 42 commences to pull guillotine 24 down to cover aperture 20. At the same time, linkage 43 to the secondary contact, comprising partition 19, guillotine 25 and fixed contact 12, is lifting guillotine 25 to expose aperture 20 in partition 19 in order to permit contact 16, 12 make to complete the circuit transfer from the primary contact to the secondary contact as described for FIGS. 5 and 6.

The functioning of linkages 42, 43 in FIG. 17 is essentially the same as in FIG. 5. Instead of the linear motions for both the guillotines 24, 25 and blade 16 in FIG. 5, in FIG. 17 the motion of butt contact 16 is rotational, and the motion of the guillotines 24, 25 is linear. This may require more complex linkage 42, 43 designs for FIG. 17 which are well-known in the mechanical arts and may, for example, be found in texts such as "Ingenious Mechanisms." The various embodiments of the present invention may be configured as transfer switches, as described in FIGS. 5 and 17, or other switchgear configurations known in the art.

In circumstances where a large number of short circuit cycles must be endured under high fault currents, or other harsh conditions, arc erosion of guillotine 24 over life may exceed specifications. To reduce degradation of guillotine 24, a secondary or sacrificial guillotine may be employed. Conceptually this serves the same function that zinc plates on ocean going ships steel plates serve. Instead of the ships steel plates corroding, the zinc plates corrode. Based on the same concept, the secondary guillotine is subjected to most of the arc induced degradation thereby extending switchgear life.

Figure 18:
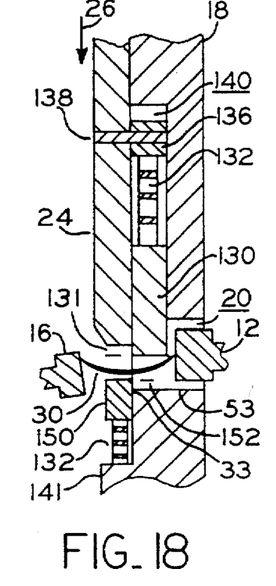
FIG. 18 is a side cross section view of the partition and guillotine fitted with a secondary and third guillotine illustrating interception of the arc primarily by the secondary guillotine.
Figure 19:
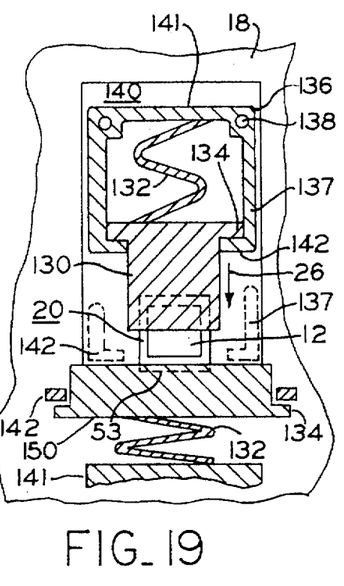
FIG. 19 is a front cross section view of the structure shown in FIG. 18 to illustrate construction of the secondary and third guillotines.

Referring now to FIGS. 18 and 19, shown are side, FIG. 18, and front, FIG. 19, cross sections of the partition 18, fixed contact 12 and guillotine 24 construction incorporating a second movable insulating member herein called a secondary guillotine 130. Guillotine 130 may be of suitable ceramics or plastic, for example, Teflon, melamine, PMMA, and are preferably of the nontracking variety. Alternatively, guillotine 130 may be a suitably insulated metal plate or a metal plate, for example, of molybdenum or other refractory or semirefractory metal. Guillotine 130 is fitted into, or disposed within recess 140 of partition 18. As shown in FIG. 18, for example, recess 140 is adjacent partition aperture 20. Alternatively, partition 18 may comprise two super imposed members held in registration to each other by suitable means such as adhesives. The partition member adjacent the guillotine 24 has an aperture corresponding to the partition recess 140 and aperture 20, and the second partition member has an aperture corresponding to aperture 20. Frame 136 holds guillotine 130 ears 134 with fingers 142. Suitable means, for example, spring 132, presses secondary guillotine 130 ears 134 against fingers 142 of frame 136 thereby capturing guillotine 130. Spring 132, may be leaf, coil or other suitable shape of metal, or alternative means, such as mechanical linkage or a suitably resilient material with springlike properties may be employed. Frame 136, which may be, for example, of suitable plastic, such as polycarbonate or metal, such as aluminum, is fastened by insulating pins 138 to guillotine 24 so that guillotine 24 is coupled to guillotine 130. Pins 138 are of dielectric material of suitable strength, for example, polycarbonate or ceramic. Pins 138 are a tight fit into partition 18 to insure that no arcing path through partition 18 is provided.

Figure 23:
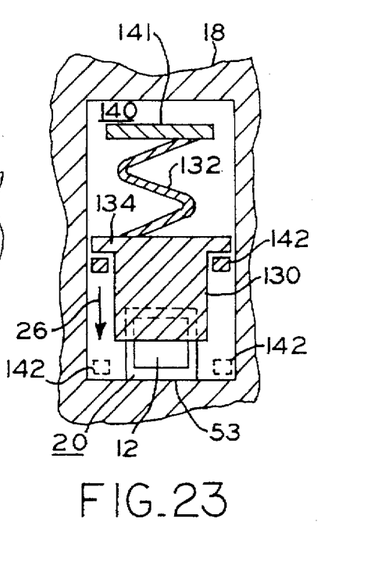
FIG. 23 illustrates structure shown in FIG. 22 where the separate frame construction has been replaced by integral guillotine molded construction.

Referring now to FIG. 23, shown is the frame 136 of FIG. 19 replaced by integral construction with guillotine 24. Molded or machined as a single piece, guillotine 24 incorporates spring stop 141 which protrudes into partition recess 140 and constrains one end of spring 132 while the other end of spring 132 is constrained by the upper surface of secondary guillotine 130. Also integral with guillotine 24 and protruding into partition recess 140 are fingers 142 which, as with frame 136, serve to register secondary guillotine 130 with guillotine 24 and cooperating with guillotine ears 134 hold guillotine 130 in place against the static compressive force of spring 132. Frame sidearms 137 and pins 138 are eliminated and partition recess 140 is reduced in size.

Referring again to FIG. 18, shown is guillotine 24 driven by a mechanism, not shown, descending from the closed circuit position to the open circuit position upon a fault condition accompanied by secondary guillotine 130. Arc 30 is shown being deflected by secondary guillotine 130 which therefore is subjected to arc 30 induced degradation. Guillotine 24, being shielded by guillotine 130, is therefore subjected to less degradation. Guillotine 130 is shown projecting slightly forward 131 of guillotine 24 to provide a large number of fault cycles before erosion of guillotine 130 exposes the edge of guillotine 24 directly to arc 30. When the force of spring 132 on guillotine 130 exceeds the opposing inertial force arising from acceleration of guillotine 130 under fault conditions then guillotine 130 remains pinned to frame 136 ears 134. Thus, the relative position of guillotines 24, 130 remain unchanged under substantially all conditions.

Figure 21:
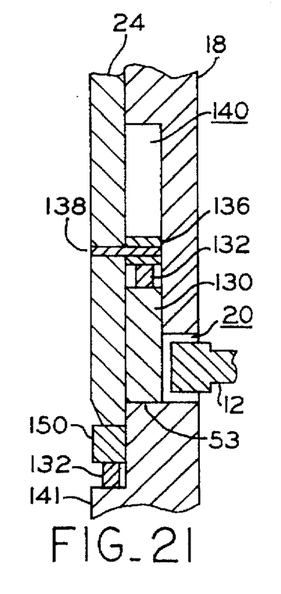
FIG. 21 illustrates structure shown in FIG. 18 after severance and extinguishment of the arc with the guillotine and secondary and third guillotine in their open circuit positions

Referring now to FIG. 21, shown is the open circuit position after fault 30 clearance. The transition from FIG. 18 to FIG. 21 comprises the following. Referring again to FIG. 19, as the lower surface, or arc compressing surface, of guillotine 130 descends and approaches a first surface 53 of aperture 20 in partition 18, arc 30 is pinched and then compressed as guillotine 130 arc compressing surface comes into substantial surface to surface contact with surface 53. In one embodiment, guillotine 130 arc compressing surface comes to a stop against surface edge 33 where butt contact is made. Surface 53 includes edge 33. Initially this may or may not cause severance of arc 30, depending on arc current and energy. Guillotine 130 serves to pin arc 30 against surface 53 while guillotine 24 continues to move, passing edge 33 where arc 30 is extinguished and spring 132 commences to actively compress.

Referring again to FIG. 19, shown is one example of construction to enable guillotine 130 to stop at surface 53 while guillotine 24 continues to travel 26 downward. Secondary guillotine 130 reaches surface 53 and stops. At this point frame 136 fingers 142 disengage from ears 134 of guillotine 130, and frame 136 continues to travel downward 26 with guillotine 24. At the same time spring 132 actively compresses against guillotine 130. Frame fingers 142, shown in dotted outline have descended toward surface 33 and stopped before reaching surface 53. This corresponds with the open circuit position of guillotine 24 shown in FIG. 21. The pressure from spring 132 on guillotine 130 keeps it pressed against surface 53. Spring 132 also serves two other useful functions. Active compression of spring 132 commences upon stoppage of guillotine 130 at surface 53 which is close to the time of arc 30 severance by guillotine 24 which has continued its downward movement 26. The compression of spring 132 may serve to absorb the energy of moving guillotine 24 after arc 30 severance and may slow it to a stop thereby reducing mechanical stresses accordingly. The second benefit is that the stored energy in spring 132 is available to assist the mechanism in the more rapid raising of guillotine 24 thereby shortening contact make time. In general, the mass of secondary guillotine 130 is small and therefore needed spring 132 forces are low. Though not shown, the arc chutes 72, 90 of FIG. 7 may be incorporated into FIGS. 18 and 19.

Referring again to FIG. 18, a further embodiment of the present invention employs a third movable electrically insulating member, herein called a third guillotine 150, which is in close proximity to, and movably attached to partition 18. Third guillotine 150 acts as a sacrificial guillotine to minimize arc erosion of arc severing edge 33 of aperture 20 of partition 18. A third guillotine 150 is positioned opposite guillotines 24 and 130 with respect to aperture 20. Third guillotine 150 preferably protrudes a small distance 152 above edge 33, thus partially covering aperture 20, and is held there by spring 132. Spring 132 is under predetermined compression between spring stop 141 and third guillotine 150 prior to guillotine 150 being engaged by guillotine 24 in a manner and purpose similar to that described for secondary guillotine 130. Fingers 142 of partition 18 engage ears 134 of guillotine 150 to provide substantially the same functioning as for guillotine 130. Like guillotine 24, guillotine 150 is made of a suitable dielectric, such as ceramic or plastic.

Referring again to FIG. 19, shown is a front view of third guillotine 150. Spring stop 141 may be integrally fabricated with partition 18 or may affixed to it in a suitable manner, for example, with screws or adhesives, or through a hole cut in partition 18 and the spring stop inserted, preferably as tight fit.

Referring again to FIG. 18, it is seen that arc 30 is being pushed down in a direction 26 by secondary guillotine 130, which is attached to guillotine 24. Because third guillotine 150 protrudes 152 above edge 33, arc 30 generally does not interact with edge 33 and so is substantially shielded from arc 30 erosion. This occurs because edge 33 is in a corner. Arcs generally do not bend into corners, which lengthens the arc path, unless forced to do so. That is, arcs follow the path of minimum energy, which is to avoid corners in dielectrics.

Figure 20:
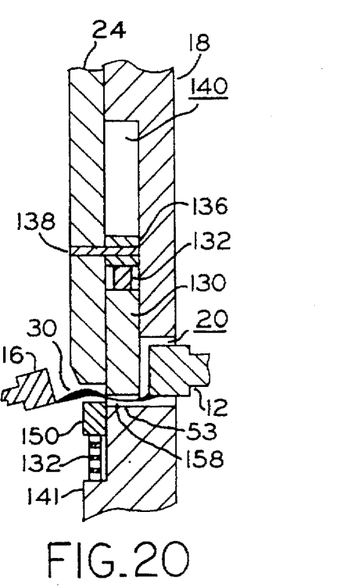
FIG. 20 illustrates structure shown in FIG. 18 illustrating compression of the arc by the secondary guillotine and just prior to compression by the third guillotine.

Referring again to FIG. 20, guillotine 24 and secondary guillotine 130 have now descended in a direction 26 such that secondary guillotine 130 has compressed arc 30 almost to the surface 53 of aperture 20. In this example, secondary guillotine 130 projects ahead of guillotine 24 a first distance 131 which is greater than a second distance 152 that third guillotine 150 projects above surface 53. Therefore, guillotine 130 will engage surface 53 before guillotine 24 engages guillotine 150. In passing between the lower surface of guillotine 130 and surface 53, the voltage drop of the arc increases because the arc is compressed thereby increasing the current limiting action.

A short time thereafter, for example, about one millisecond, guillotine 24 is about to engage third guillotine 150 and commence to compress arc 30. This gives rise to a further increase in the arc voltage drop and a commensurate increase in current limiting. Guillotine 24 now pushes guillotine 150 downward in a direction 26, compressing spring 132 and then, for example, in about another millisecond, edge 31 (see FIG. 1) of guillotine 24 passes edge 33 of aperture 20 thereby extinguishing arc 30. With predetermined spring characteristics for springs 132, guillotines 130, 150 can each be caused to compress arc 30 in a predetermined manner thereby optimizing the change in arc impedance characteristics with time. Completion of downward motion in a direction 26, as shown in FIG. 21, shows springs 132 substantially fully compressed and guillotine 24 positioned with sufficient overlap 10 (FIG. 2) to withstand the applied voltage. Thus, guillotines 130, 150 have served two purposes, one to shield guillotine 24 and edge 33 of aperture 20 respectively, which are the primary arc control surfaces, against arc induced damage, and second, to improve switchgear current limiting characteristics by increasing the arc impedance as described.

Figure 22:
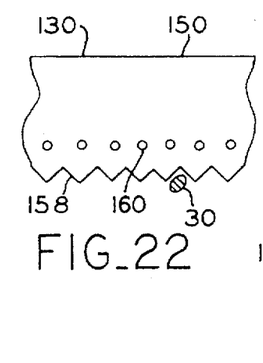
FIG. 22 illustrates construction of the arc engaging surfaces of the secondary and third guillotine to provide high impedance paths for the arc.

Referring now to FIG. 22, the surfaces of guillotines 130, 150 which engage arc 30 may be prepared with geometries, for example, small corrugations 158 or may have small diameter holes 160 for the arc to pass through as guillotine 130 engages surface 53 and guillotine 24 engages guillotine 150. The small dimensions of the corrugations or holes compress the arc 30 and create a high impedance path with consequent high arc 30 voltage drop which provides desired current limiting action. Many geometries and their variations are possible, with corrugations and holes being but two examples. To further enhance switchgear arc quenching and current limiting, dielectric members, such as guillotines 130, 150 may be made of or have incorporated by embedding therein materials that under the influence of arc 30 generate arc quenching and/or current limiting gases or vapors, for example, electro-negative gases such as $SF_6$. In general, when embedded, the materials, need only be incorporated in those parts of the dielectrics that engage arc 30 such as designated surfaces and corrugations 158 and holes 160 of FIG. 22. Though springs 132 are employed with guillotines 130, 150. Other means such as elastomers, magnetics, pneumatic or hydraulic systems may be used.

Referring again to FIG. 22, as guillotine 130 engages arc 30 and arc 30 is caused to sweep across the arc engaging surface of guillotine 130, it is encountering cooler surfaces which cool the arc 30, which in turn increases its impedance thereby lowering the arc 30 current. Referring again to FIG. 18, as guillotine 130 approaches surface 53, arc 30 commences to compress, increasing its impedance. Referring again to FIG. 20, as guillotine 24 continues to travel, spring 132 compresses against guillotine 130 causing arc 30 to be further squeezed between corrugations 158 and surface 150 thereby further increasing the arc impedance and lowering the arc current.

The rate of impedance change of arc 30 caused by progressive compression of arc 30 between guillotine 130 and surface 53 and subsequently between guillotines 24 and 150 is influenced by the spring characteristics of springs 132. The stiffer the spring 132, the more rapid the arc 30 compression rate and its corresponding increase in impedance. Spring 132 properties are selected to provide a predetermined rate of arc 30 impedance change, with corresponding current limiting, with time.

With guillotine 130 in predetermined proximity to surface 53 and, having reduced the arc current 30 by both arc compression and the arc sweeping action, guillotine 24 subsequently commences to compress arc 30 against guillotine 150 further increasing the arc 30 impedance and lowering the arc current. As guillotine 24 continues to move, spring 132 compresses against guillotine 150 causing arc 30 to be further compressed thereby further increasing its impedance and lowering the arc current. This may also be coupled with the beneficial current limiting effects of the sweeping arc. In FIG. 21 is illustrated the final position of all components after fault clearance.

The sequential effects of guillotine 130 first compressing arc 30 followed by guillotine 24 in a predetermined time sequence, provides a predetermined rate of change in current limiting. Time constants for the above may range from a fraction of a millisecond to several milliseconds. Though guillotine 130 is described as compressing arc 30 first, guillotine 24 may be arranged to compress arc 30 first.

Figure 24:
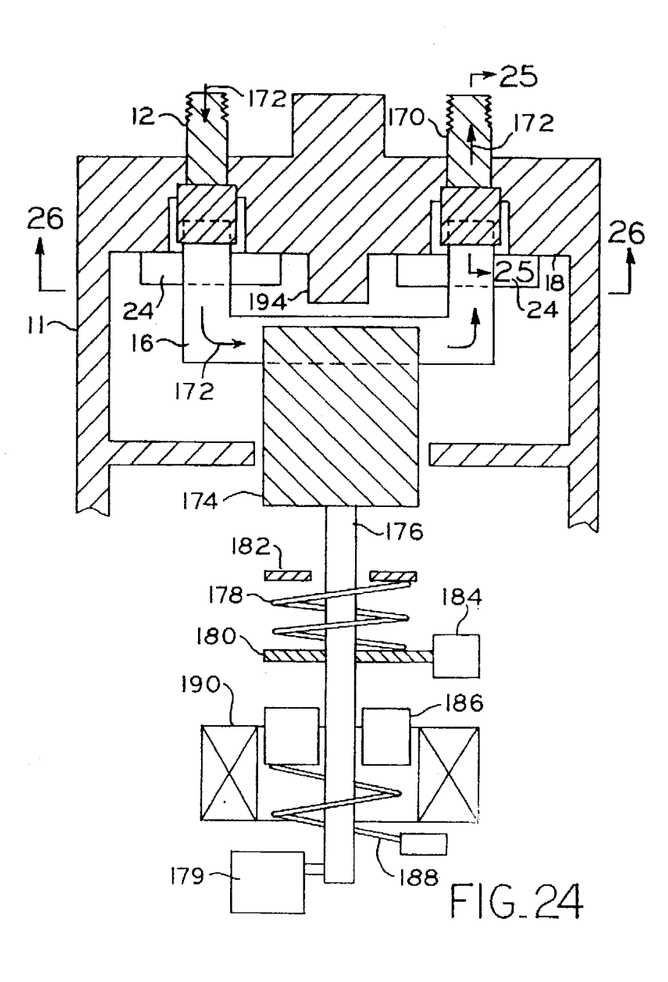
FIG. 24 is a cross-section, top down view of switchgear employing two fixed contacts and bridging moving contact.

Referring now to FIG. 24, shown is a further preferred switchgear embodiment of the present invention incorporating two fixed contacts 12, 170 which are interconnected by moving contact 16 when in the closed circuit, current carrying condition. Current 172 flows from contact 12 through contact 16 and out contact 170. Contact 16, in effect, acts as a shorting bar between contacts 12 and 170. In the open circuit, non-current carrying condition, contact 16 is physically removed from the circuit. That is, the circuit terminates at contacts 12 and 170. This provides the advantage of a relatively, small, minimum sized moving contact that does not require a flexible lead. Its size is determined by the voltage isolation needed between contacts 12 and 170. At high currents, for example, from about the 100 to several thousand ampere range, the savings in moving contact size and weight can be considerable which is reflected in mechanism size, energy requirements and cost.

Contacts 12, 16, 170 are shown as finger and blade construction, similar to that in FIGS. 1, 3, 4 and 5. Alternatively, the butt contact construction of FIG. 7 may be employed. The arcing contacts, 63, 65 of FIG. 16, may also be incorporated. Moving contact 16 is connected to insulator 174 which in turn is connected to shaft 176. Insulator 174 serves to isolate the low-cost, low voltage mechanisms from the contact 16 voltage. Various mechanisms are connected to shaft 176, such as latch and toggle 179, which may have the necessary energy supplied by, for example, electromagnetic, manual, pneumatic or hydraulic means.

For purposes of description, the following construction is employed. Compression spring 178 movably mounted on shaft 176 is captured between moving plate 180 mounted on shaft 176 and stationary plate 182 mounted on housing 11. A manual toggle 184, as in conventional circuit breakers, may be used to set the circuit breaker. Magnetic plunger 186, shown in the form of a hollow cylinder, is movably mounted on shaft 176.

To establish the closed circuit, current carrying condition wherein moving contact 16 engages fixed contacts, 12, 170, manual toggle 184 is moved by the operator in the same manner as conventional manual circuit breakers. Upon activation of toggle 184, movable plate 180 causes spring 178 to compress against fixed plate 182 and upon engagement of contact 16 with contacts 12, 170, latch mechanism 179 engages to maintain contact 16 in the closed circuit position against compressed spring 178. Alternately, to close the circuit, solenoid 190 may be energized to drive magnetic plunger 186 against moving plate 180 which compresses spring 178 with the latch 179 again engaging as before. Upon engagement of latching mechanism 179 to hold contact 16 in the closed circuit condition and upon de-energizing solenoid 190, return spring 188 returns plunger 186 to its original position. With plunger 186 not fixedly mounted to shaft 176, its inertia is substantially eliminated during fault operation. A thin Teflon sleeve over shaft 176 where plunger 186 travels can provide a low friction interface between shaft 176 and plunger 186. Upon a fault, the toggle in mechanism 179 opens the latch and spring 178 causes contact 16 to disengage and rapidly move into the open circuit condition.

Figure 25:
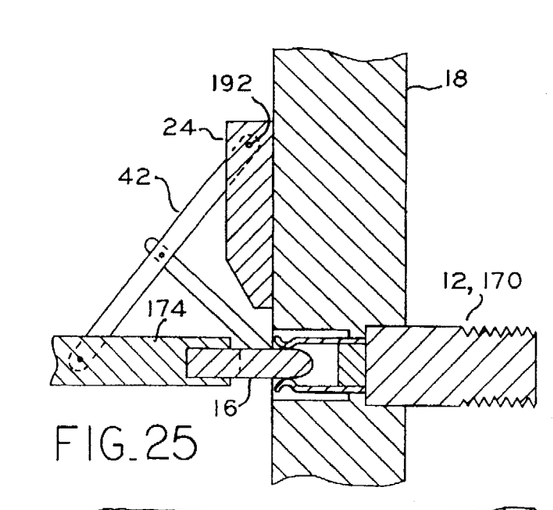
FIG. 25 is a cross-section view 25—25 of FIG. 24 showing contact and guillotine linkage.
Figure 26:
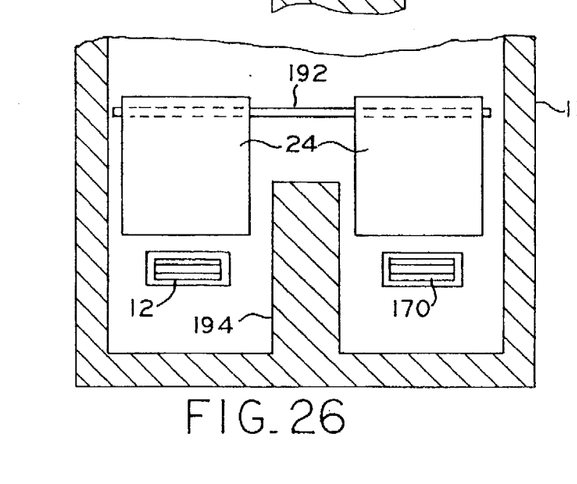
FIG. 26 is a face-on cross-section view 26—26 of FIG. 24 showing dual fixed contact construction and associated guillotines.

Referring now to FIG. 25, shown is cross-section A—A of FIG. 24 through contacts 16 and 12, 170 to illustrate linkage 42 coupling moving contact 16 with guillotines 24, the construction and operation being substantially similar to that of FIGS. 5, 6. Referring now to FIG. 26, shown is a face on view of the construction of fixed contacts 12, 170 and guillotines 24 through section B—B of FIG. 24. For clarity, contact 16 is omitted. Shown are guillotines 24 in the raised, closed circuit position. A common guillotine shaft 192 is employed though each guillotine may have individual shafts 192 and linkage 42. Insulating divider 194, which may be molded into housing 11 provides further voltage isolation between contacts 12 and 170. Alternatively, insulating divider 194 may be omitted and a single, continuous guillotine 24 may be employed for both contacts, 12, 170. This could be suitable for use at lower voltages. For clarity, hidden construction is shown in dotted outline in FIGS. 13, 15, 19, 23, 24, 26, 27, 29.

Again referring to FIG. 24, the benefit of the bridging contact 16 construction is that the flexible high current conductor normally needed for connection to contact 16 is eliminated. In addition, by removing contact 16 from the circuit in the open circuit condition, voltage isolation problems are simplified.

Figure 27:
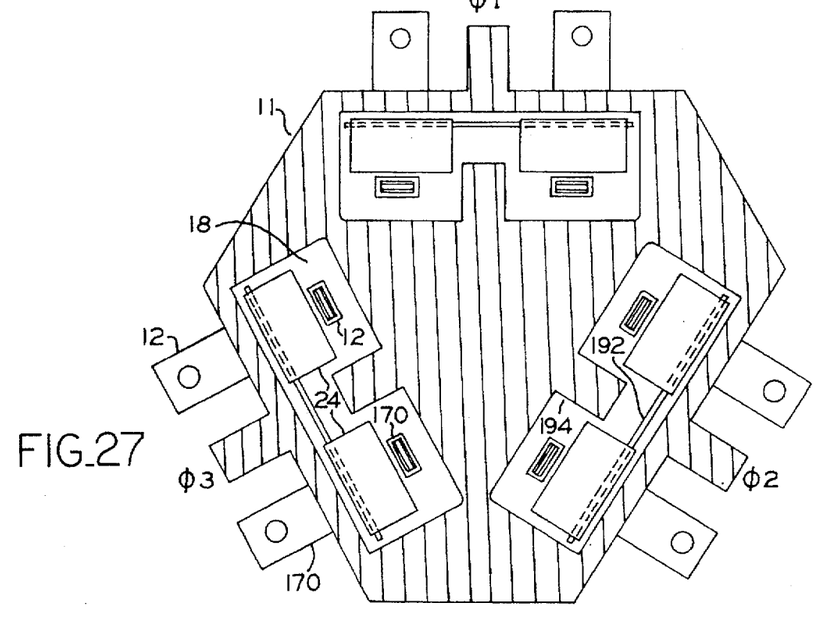
FIG. 27 is a cross-section view of the guillotine and fixed contact construction shown in FIGS. 24, 25, 26 configured for three phase applications.

Referring now to FIG. 27, shown is the construction of FIGS. 24, 25, 26 arranged for use in a three-phase circuit. Three sets of fixed contacts 12, 170 which are arranged with corresponding guillotines 24, as in FIG. 26, are shown symmetrically arranged as phases ($\phi$) 1, 2 and 3. Not shown are three corresponding contacts 16 mounted on a common insulator 174 and shaft 176 with appropriate spring 178 and stops 180, 182 along with solenoid 190, plunger 186, return spring 188 and mechanism 178 as in FIG. 24. The three contacts 16 are positioned to engage corresponding contacts 12, 170 of phases 1, 2 and 3. The three contacts 16, for phases 1, 2, and 3 share a common movement and control system for moving from the open circuit to the closed circuit condition, and also for the reverse movement. This reduces costs and improves precision, that is, synchronization is inherent, and the unitized construction and compact size minimize the adverse effects of temperature and environment. Alternatively, parallel 3 phase construction, similar to that of FIG. 5 may be employed.

When switching three-phase loads, for example, with power factor correction capacitors, it is desirable to have each phase close at the zero voltage cross over so as to minimize harmonics and voltage transients. When a load is inductive, such as a motor, contact opening at each zero current crossover is desirable. With an integral drive system and being mounted on a common structure, all three contacts 16 move synchronously.

Figure 28:
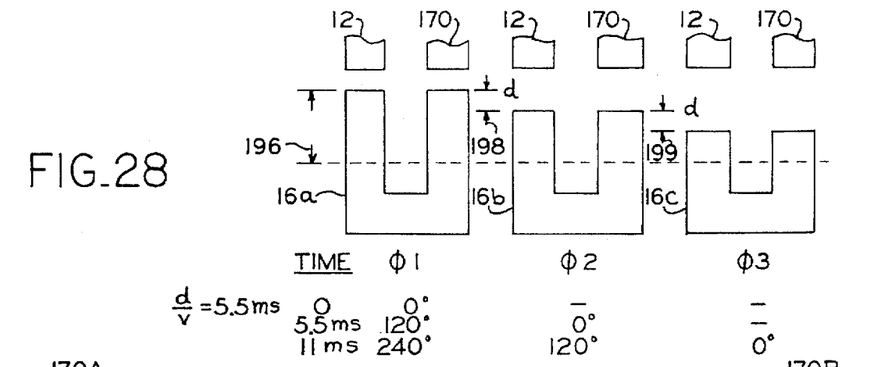
FIG. 28 illustrates moving contact geometries configured to provide sequential contact make or break for zero voltage or current crossing operations.

Referring now to FIG. 28, shown are the three moving contacts, 16a, 16b and 16c, one for each phase in FIG. 27. To cause each contact to engage at a zero voltage or current crossing, they must close sequentially at 120° intervals. At 60 Hz, one cycle is 16.7 milliseconds (ms) or 5.5 ms between phases. By making contacts 16a, b and c progressively shorter, each phase will close the circuit at specified intervals since all are traveling together on the same mount. Contact 16a makes contact at 0°, as shown in the table. Contact 16b is shorter 198 by distance (d) such that distance (d) divided by the contact velocity (v) is 5.5 ms, corresponding to 120° for $\phi$1 and a 0° contact make for phase ($\phi$) 2. Contact 16a continues to penetrate fixed contacts 12, 170. In like manner, contact 16c is also shorter 199 by distance (d) than contact 16b such that contact make occurs at 0° in phase ($\phi$) 3, while phases 1 and 2 are at 240° and 120° respectively, 11 ms after phase ($\phi$) 1 contact make. Upon completion of circuit make, contact 16a will have penetrated into contacts 12, 170 a distance 196. Under conditions of contact break, the reverse will occur, with contact 16c being the first to break contact. Electronic timing systems are commercially available to cause contact 16a to make contact at a zero voltage crossing. The switchgear designs of FIGS. 24 and 27 may also be provided with other embodiments of the present invention, for example, the arc chutes 72, 90 of FIG. 7 and the multiple guillotines 130, 150 of FIG. 18.

Figure 29:
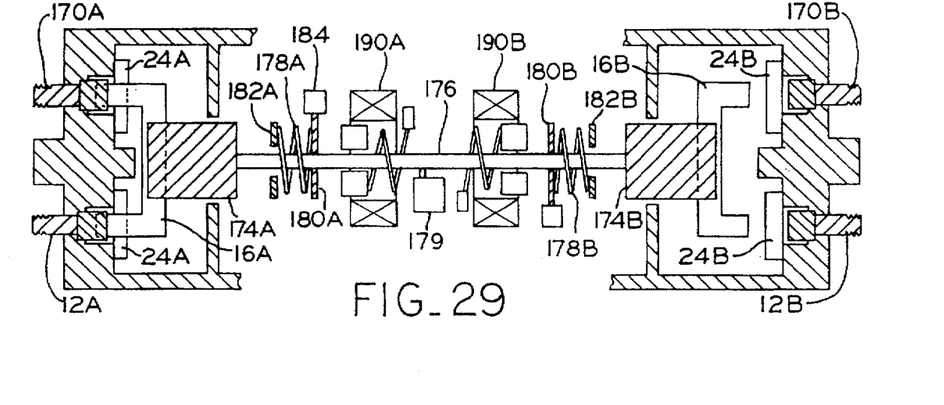
FIG. 29 illustrates a pair of the switchgear shown in FIG. 24 configured as a transfer switch.

Referring now to FIG. 29, shown is the switchgear of FIGS. 24 and 27 configured as a transfer switch wherein power flow may be transferred from one set of contacts 12A, 170A to a second set 12B, 170B under pre-determined circumstances such as a fault. Inasmuch that contact sets 12A, 170A and 12B, 170B are isolated from each other, a new level of design flexibility is available. For example, contacts 12A, 170A may comprise one leg of the DC bus, for example, between battery and the inverter, and the second set of contacts 12B, 170B may comprise one leg of the incoming AC power line. In normal UPS operation, for example, when providing power to a number of computers, DC contacts 12A, 170A are closed and contacts 12B, 170B are open. Upon need for repairs due to malfunction or failure of the inverter or other DC link component, the transfer switch activates and switches from DC contacts 12A, 170A to AC contacts 12B, 170B thereby maintaining power to the computers which could otherwise experience an expensive crash. Other areas of application include Adjustable Speed Drives (ASDs) for electric motors, critical process controls, and general AC applications, as well as for applications that require two or more independent power sources whether AC, DC or some combination of AC and DC. FIG. 29 shows two switchgear of FIG. 24 attached end-to-end, however, other mechanical coupling methods may be employed instead of the straight in-line construction shown. These may include, for example, a rocker arm design (not shown) with one contact assembly including contacts 12A, 170A attached to one end of the rocker arm (not shown) and contact 12B, 170B assembly attached to the other end (not shown). As the arm rocks, contacts 12A, 170A make while 12B, 170B break, and visa-versa.

The transfer switch of FIG. 29 may also be provided with power "off" capability. This is accomplished by causing moving contacts 16A, 16B to stop in an open circuit, non carrying position intermediate between fixed contact sets 12A, 170A and 12B, 170B. With moving contacts 16A and 16B stopped intermediate between fixed contact sets 12A, 170A and 12B, 170B, guillotines 24A and 24B cover apertures 20 in partitions 18, as described in FIG. 2, that is guillotines 24A, B overlap aperture 20 a distance 10 thereby isolating contacts 16A, B from contacts 12A, 170A, 12B, 170B. Referring again to FIG. 29, for example, contact make between contacts 16A and 12A, 170A, guillotines 24A would rise as previously described, and guillotines 24B would descend lower on partition 18, for example, the partition overlap distance 10 (FIG. 2) might double. In like manner, with contact make between 16B, 12B, 170B, the reverse of the above occurs. The transfer switch configurations of FIGS. 5 and 17 would function mechanically in substantially the same manner as described above for FIG. 29.

Operation of the example transfer switch in FIG. 29 would have, for example, solenoid 190A cause contacts 16A and 12A, 170A to engage resulting in contacts 16B and 12B, 170B being in the open circuit condition. Upon a power transfer command, such as a fault in circuit 16A, 12A, 170A, latch 179 would toggle causing spring 178A to disconnect contacts 16A, 12A, 170A. Upon shaft 176 having travelled some distance, solenoid 190B is energized causing shaft 176 to continue its movement until contacts 16B, 12B and 170B make and mechanism 179 latches shaft 176 in place. For the intermediate, power off condition, upon release by mechanism 179, spring 178 drives shaft 176 as above. However, solenoid 190B is not activated and shaft 176 is caused to stop intermediate between 12A, 170A and 12B, 170B by mechanism 179 in the completely "power off" condition. This is usually required for malfunction or failure of the load, such as a motor. Thus, low cost, circuit breaker/transfer switches capable of handling isolated DC and AC power may be fabricated. The construction lends itself to multiple pole designs, such as two poles, that is both legs of a single phase line, three-phase application as illustrated in FIG. 27, and a four-pole version of FIG. 27 for three-phase use when the ground is also transferred.

From the preceding description of various embodiments of the present invention, it is evident that the objects of the invention are attained. Although the invention has been described and illustrated in detail, it is to be clearly understood that the same is intended by way of illustration and example only and is not to be taken by way of limitation. Accordingly, the spirit and scope of the invention are to be limited only by the terms of the appended claims.

What is claimed is:

1. Apparatus comprising:
   a stationary electrically insulating member having an aperture,
   at least one fixed contact,
   at least one movable contact moveable between a closed current carrying position with said fixed contact and an open current-interrupting position, said movable contact at least partially located in said first insulating member aperture when in said closed current carrying position,
   a first movable electrically insulating member coupled to said movable contact so that when current flow is interrupted by moving said movable contact to said open current-interrupting position, said first movable electrically insulating member covers said aperture, and
   a second movable electrically insulating member having an arc compressing surface, said second movable electrically insulating member coupled to said first movable electrically insulating member so that when current flow is interrupted by moving said movable contact to said open current-interrupting position, said second movable electrically insulating member arc compressing surface comes into substantial surface to surface contact with a surface of said substantially stationary electrically insulating member at a periphery of said aperture.

2. An apparatus in accordance with claim 1 further comprising a third movable electrically insulating member biased so that when said movable contact is in said closed current carrying position, said third movable electrically insulating member at least partially extends beyond a periphery of said aperture and partially covers said aperture, and so that when current flow is interrupted by moving said movable contact to said open current-interrupting position, said first movable insulating member engages said third movable electrically insulating member and moves said third movable electrically insulating member so that said third movable electrically insulating member no longer partially covers said aperture.

3. Apparatus in accordance with claim 1 wherein said substantially stationary electrically insulating member further comprises a recess, said recess adjacent said aperture, and wherein said second movable insulating member is disposed within said recess.

4. Apparatus in accordance with claim 1 further comprising a housing, said substantially stationary electrically insulating member partitioning said housing into two chambers, said aperture providing communication between said two chambers.

5. Apparatus in accordance with claim 1 wherein said movable contact moves linearly.

6. Apparatus in accordance with claim 1 wherein said first movable electrically insulating member is in sliding contact with said substantially stationary electrically insulating member.

7. Apparatus in accordance with claim 6 wherein said first movable electrically insulating member has a dielectric strength exceeding a voltage applied across said fixed and said movable contacts.

8. Apparatus in accordance with claim 1 wherein at least one of said first movable electrically insulating member and said second movable electrically insulating member moves linearly.

9. Apparatus in accordance with claim 2 wherein said third movable electrically insulating member moves linearly.

10. Apparatus in accordance with claim 1 wherein said first movable electrically insulating member has an arc severing edge, and said second movable electrically insulating member is coupled to said first movable electrically insulating member so that when said movable contact is in said closed current carrying position, said arc compressing surface is nearer to said aperture than said arc severing edge.

11. Apparatus in accordance with claim 1 wherein at least one of said second movable electrically insulating member and said third electrically insulating member has at least one of apertures and corrugations therein.

12. Apparatus in accordance with claim 1 wherein at least one of said second movable electrically insulating member and said third movable electrically insulating member are constructed of laminated dielectric material.

13. Apparatus in accordance with claim 1 wherein said fixed contact comprises at least two fingers separated by a spacer, said fingers configured to be in electrical contact with said movable contact when said movable contact is in said closed current carrying position with said fixed contact, and at least one spring, said spring in contact with one of said fingers so that said one finger is biased toward said other finger, and so that when said movable contact is in said closed current carrying position with said fixed contact, said biased finger is pressed against said movable contact.

14. Apparatus in accordance with claim 13 wherein said spring comprises at least one of magnetic and non-magnetic metal material.

15. Apparatus in accordance with claim 1 wherein said fixed contact comprises at least two fingers separated by a spacer, said fingers configured to be in electrical contact with said movable contact when said movable contact is in said closed current carrying position with said fixed contact, and at least one biasing strip, said biasing strip in contact with one of said fingers so that said one finger is biased toward said other finger, and so that when said movable contact is in said closed current carrying position with said fixed contact, said biased finger is pressed against said movable contact.

16. Apparatus in accordance with claim 1 further comprising a movable arcing contact and a fixed arcing contact, said movable arcing contact connected to said movable contact, said fixed arcing contact connected to said fixed contact, and at least one of said fixed and movable arcing contacts comprising a plurality of substantially parallel fingers, said fingers constructed of magnetic material laminated with high conductivity metal.

17. Apparatus in accordance with claim 1 further comprising a first arc chute and a second arc chute, said first arc chute mounted in said stationary electrically insulating member aperture and adjacent said fixed contact, said second arc chute comprising a plurality of plates adjacent to said moveable contact.

18. Apparatus in accordance with claim 1 further comprising at least two leads, one of said leads connected to said fixed contact and the other of said leads connected to said movable contact, said leads configured to generate a magnetic field, and wherein said first movable electrically insulating member moves linearly, and said magnetic field generates a force in substantially the same direction as said first movable electrically insulating member movement.

19. A method for interrupting current flow between a fixed contact and a movable contact in a system having first and second movable electrically insulating members, said method comprising the steps of:

moving the movable contact away from the fixed contact;

positioning the first and second movable electrically insulating members between the movable contact and the fixed contact; and extinguishing an arc between the fixed contact and the movable contact.

20. A method in accordance with claim 19 wherein the fixed and movable contacts are located in a housing having a stationary electrically insulating member partitioning the housing into two chambers, the stationary electrically insulating member having an aperture therein providing communication between the two chambers, the movable contact at least partially located in the aperture when in a closed current carrying position, and wherein extinguishing the arc comprises the steps of positioning an arc compressing surface of the second movable electrically insulating member into surface to surface contact with a surface of the stationary electrical insulating member at a periphery of the aperture, and positioning the first movable electrically insulating member to cover the aperture.

21. A method in accordance with claim 19 wherein the system further includes a third movable electrically insulating member, and said method further comprises the step of positioning the third movable electrically insulating member partially between the movable contact and the fixed contact.

22. Apparatus for interrupting current flow between a fixed contact and a movable contact, said apparatus configured to move the movable contact away from the fixed contact and extinguish an arc between the fixed contact and the movable contact, said apparatus comprising a housing, a stationary electrically insulating member partitioning said housing into two chambers, said stationary electrically insulating member having an aperture therein, said aperture providing communication between said two chambers, a first movable electrically insulating member coupled to the movable contact, a second movable electrically insulating member coupled to said first movable electrically insulating member, said first and second movable electrically insulating members adjacent said stationary electrically insulating member, and a third movable electrically insulating member, said third movable electrically insulating member coupled to said stationary electrically insulating member and adapted to move between a first position wherein it at least partially extends beyond a periphery of said aperture and partially covers said aperture, and a second position wherein it does not partially cover said aperture, said second movable electrically insulating member having an arc compressing surface, and said arc compressing surface is configured to come into substantial surface to surface contact with a surface of said stationary electrically insulating member at a periphery of said aperture, and said first movable electrically insulating member adapted to engage said third movable electrically insulating member to move said third movable electrically insulating member from said first position to said second position.

* * * * *